(12) United States Patent
Cartland

(10) Patent No.: US 11,267,588 B2
(45) Date of Patent: Mar. 8, 2022

(54) ORBITAL MECHANICS OF IMPULSIVE LAUNCH

(71) Applicant: QUICKLAUNCH, INC., Carmel, CA (US)

(72) Inventor: Harry E. Cartland, Carmel, CA (US)

(73) Assignee: QUICKLAUNCH, INC., Carmel, CA (US)

( * ) Notice: Subject to any disclaimer, the term of this patent is extended or adjusted under 35 U.S.C. 154(b) by 0 days.

(21) Appl. No.: 16/529,666

(22) Filed: Aug. 1, 2019

(65) Prior Publication Data

US 2019/0352021 A1    Nov. 21, 2019

Related U.S. Application Data

(63) Continuation-in-part of application No. 15/143,386, filed on Apr. 29, 2016.

(51) Int. Cl.
*B64G 1/00* (2006.01)
*B64G 1/24* (2006.01)
*B64G 1/40* (2006.01)

(52) U.S. Cl.
CPC .......... *B64G 1/007* (2013.01); *B64G 1/242* (2013.01); *B64G 1/409* (2013.01)

(58) Field of Classification Search
CPC .............................. B64G 1/007; B64G 1/409
See application file for complete search history.

(56) References Cited

U.S. PATENT DOCUMENTS

| | | |
|---|---|---|
| 2,380,317 A | 7/1945 | Kline et al. |
| 2,993,412 A | 7/1961 | Goldsmith |
| 3,131,597 A | 5/1964 | Gram, Jr. et al. |
| 3,245,318 A | 4/1966 | Finkelstein et al. |
| 3,384,323 A | 5/1968 | Gilbert et al. |

(Continued)

FOREIGN PATENT DOCUMENTS

| | | |
|---|---|---|
| WO | WO/2011/038365 A1 | 3/2011 |
| WO | WO/2011/038369 A1 | 3/2011 |

OTHER PUBLICATIONS

PCT/US2010/50437 International Search Report and Written Opinion dated Dec. 10, 2010.

(Continued)

*Primary Examiner* — Nicholas McFall
(74) *Attorney, Agent, or Firm* — Strategic Innovation IP Law Offices, P.C.

(57) ABSTRACT

Methods of launching a vehicle using impulsive force are disclosed. In one instance, a vehicle is launched easterly with impulsive force in a plane corresponding to the vehicle's elliptical orbital path. In another instance, a method of closing a timing difference is disclosed. The vehicle undergoes a series of forces after impulsive launch. The first force establishes an orbit having a period significantly different from the orbital period of a satellite or desired vehicle location, closing the difference in an integer number of orbits. The second force establishes the vehicle in circular orbit with the satellite or desired vehicle location. In another instance, the vehicle launched impulsively from a first celestial body travels a first path, and the vehicle experiences a second force along a hyperbolic path about the second celestial body and enters circular orbit about the second celestial body.

21 Claims, 12 Drawing Sheets

(56) References Cited

U.S. PATENT DOCUMENTS

| | | | |
|---|---|---|---|
| 3,427,648 | A | 2/1969 | Manning et al. |
| 3,453,960 | A | 7/1969 | Qualls |
| 3,597,969 | A | 8/1971 | Curchack |
| 3,665,861 | A | 5/1972 | Jaslow |
| 3,706,281 | A | 12/1972 | Hatakeyama |
| 3,714,900 | A | 2/1973 | Feldmann |
| 3,738,279 | A | 6/1973 | Eyre et al. |
| 3,750,578 | A | 8/1973 | Blajda |
| 3,759,184 | A | 9/1973 | Blajda et al. |
| 3,769,912 | A | 11/1973 | Friend |
| 3,771,458 | A | 11/1973 | Schweimler et al. |
| 3,780,658 | A | 12/1973 | de Longueville et al. |
| 3,802,345 | A | 4/1974 | La Costa |
| 3,834,314 | A | 9/1974 | Young |
| 3,905,299 | A | 9/1975 | Feldmann |
| 4,038,903 | A | 8/1977 | Wohlford |
| 4,049,367 | A | 9/1977 | Tominaga et al. |
| 4,181,152 | A | 1/1980 | Nicoloff |
| 4,284,008 | A | 8/1981 | Kirkendall et al. |
| 4,314,510 | A | 2/1982 | Jeter et al. |
| 4,434,718 | A | 3/1984 | Kopsch et al. |
| 4,669,212 | A | 6/1987 | Jackson et al. |
| 4,702,027 | A | 10/1987 | Stanley |
| 4,709,638 | A | 12/1987 | Broden et al. |
| 4,800,816 | A | 1/1989 | Meyer |
| 4,886,223 | A | 12/1989 | Gartner |
| 4,982,669 | A | 1/1991 | Bisping et al. |
| 5,012,744 | A | 5/1991 | Sowash |
| 5,165,041 | A | 11/1992 | Bjerke et al. |
| 5,167,386 | A | 12/1992 | Laquer et al. |
| 5,404,816 | A | 4/1995 | Burri |
| 5,481,980 | A | 1/1996 | Engel et al. |
| 5,666,897 | A | 9/1997 | Armstrong |
| 5,716,029 | A * | 2/1998 | Spitzer .................. B64G 1/007 244/158.5 |
| 5,961,077 | A * | 10/1999 | Koppel .................. B64G 1/242 244/158.5 |
| 5,966,858 | A | 10/1999 | Curtis et al. |
| 6,086,020 | A | 7/2000 | Machiussi |
| 6,116,136 | A | 9/2000 | Kirschner et al. |
| 6,116,543 | A * | 9/2000 | Koppel .................. B64G 1/002 244/158.5 |
| 6,234,082 | B1 | 5/2001 | Cros et al. |
| 6,257,527 | B1 | 7/2001 | Redding, Jr. |
| 6,298,786 | B1 | 10/2001 | Grosskrueger et al. |
| 6,341,749 | B1 * | 1/2002 | Ocampo .................. B64G 1/007 244/158.5 |
| 6,494,406 | B1 | 12/2002 | Fukushima et al. |
| 6,530,543 | B2 | 3/2003 | Redding, Jr. |
| 6,536,350 | B2 | 3/2003 | Cartland et al. |
| 6,543,723 | B1 * | 4/2003 | Oh .................. B64G 1/007 244/158.5 |
| 6,685,141 | B2 | 2/2004 | Penn |
| 7,526,988 | B2 | 5/2009 | Elder |
| 7,775,148 | B1 | 8/2010 | McDermott |
| 7,832,687 | B1 * | 11/2010 | Das .................. B64G 1/007 244/158.5 |
| 8,519,312 | B1 | 8/2013 | Merems |
| 8,536,502 | B2 | 9/2013 | Hunter et al. |
| 8,664,576 | B2 | 3/2014 | Hunter et al. |
| 8,915,472 | B2 * | 12/2014 | Aston .................. B64G 1/405 244/171.1 |
| 8,979,033 | B2 | 3/2015 | Hunter et al. |
| 9,567,107 | B2 | 2/2017 | Cartland |
| 9,567,108 | B2 | 2/2017 | Hunter et al. |
| 10,427,804 | B1 | 10/2019 | Cartland |
| 2008/0257192 | A1 | 10/2008 | Schaeffer |
| 2009/0211225 | A1 | 8/2009 | Nyberg et al. |
| 2010/0212481 | A1 | 8/2010 | Koth |
| 2012/0187249 | A1 | 7/2012 | Hunter et al. |
| 2013/0319212 | A1 | 12/2013 | Hunter |
| 2015/0175278 | A1 | 6/2015 | Cartland |
| 2015/0307213 | A1 | 10/2015 | Hunter et al. |

OTHER PUBLICATIONS

PCT/US2010/050441 International Search Report and Written Opinion dated Nov. 26, 2010.
PCT/US2010/50437 International Preliminary Report on Patentability dated Mar. 27, 2012.
PCT/US2010/050441 International Preliminary Report on Patentability dated Mar. 27, 2012.
U.S. Appl. No. 15/143,386 Office Action dated Jul. 27, 2018.
U.S. Appl. No. 15/143,386 Amendment dated Oct. 26, 2018.
U.S. Appl. No. 15/143,386 Office Action dated Jan. 2, 2019.
U.S. Appl. No. 15/143,386 Amendment dated Apr. 2, 2019.
U.S. Appl. No. 15/143,386 Notice of Allowability dated May 17, 2019.
Elahi, Amina; Ready, Aim, Resupply; Popular Science; Feb. 2010; 2 pp.
Gilreath, H., et al.; The Feasibility of Launching Small Satellites with a Light Gas Gun; 12th AIAA/USU Conference (Aug. 31, 1998) on Small Satellites; SSC98-III-6; pp. 1-20.
Gilreath, Harold E., et al., Gun-Launched Satellites; John Hopkins APL Technical Digest; July-Sep. 1999, 17 pp.; vol. 20, No. 3; 1999 by the John Hopkins University Applied Physics Laboratory.
Gourley, Scott R.; Sharp Gun Promises to Deliver as Launcher; Jane's Defense Weekly; The Global Defense Weekly; Jun. 19, 1996; pp. 91-92.
Gourley, Scott R.; The Jules Verne Gun; Popular Mechanics; Dec. 1996; 5 pp.
Henderson, Breck W.; Livermore Proposes Light Gas Gun For Launch of Small Payloads; Aviation Week & Space Technology; Jul. 23, 1990; pp. 78-79.
May, Michael M.; The SHARP Gas Gun: Shooting Payloads into Space Jules Verne's Way; Energy Technology Review (E&TR), University of California, Lawrence Livermore National Laboratory; Jul. 1993; 13 pp.
Scott, William B., Sharp Gun Accelerates Scramjets to Mach 9; Aviation Week & Space Technology; Sep. 9, 1996; 3 pp; A Publication of the McGraw-Hill Companies.
Wolkomir, Richard; Shooting Right for the Stars With one Gargantuan Gas Gun; Smithsonian; Jan. 1996; 9 pp.
Roger R. Bate, Donald D. Mueller, and Jerry E. White, "Fundamentals of Astrodynamics," Dover Publications, New York, 1971, pp. 162-169. (ISBN 0-486-60061-0).
Robinson, Eric; "First Vertical Light-Gas Launch for Space Access by Green Launch"; Escondido, California, Business Wire; https://www.businesswire.com/news/home/20220113005870/en/First-Vertical-Light-Gas-Launch-for-Space-Access-by-Green-Launch; Jan. 13, 2022; 1 pp.

* cited by examiner

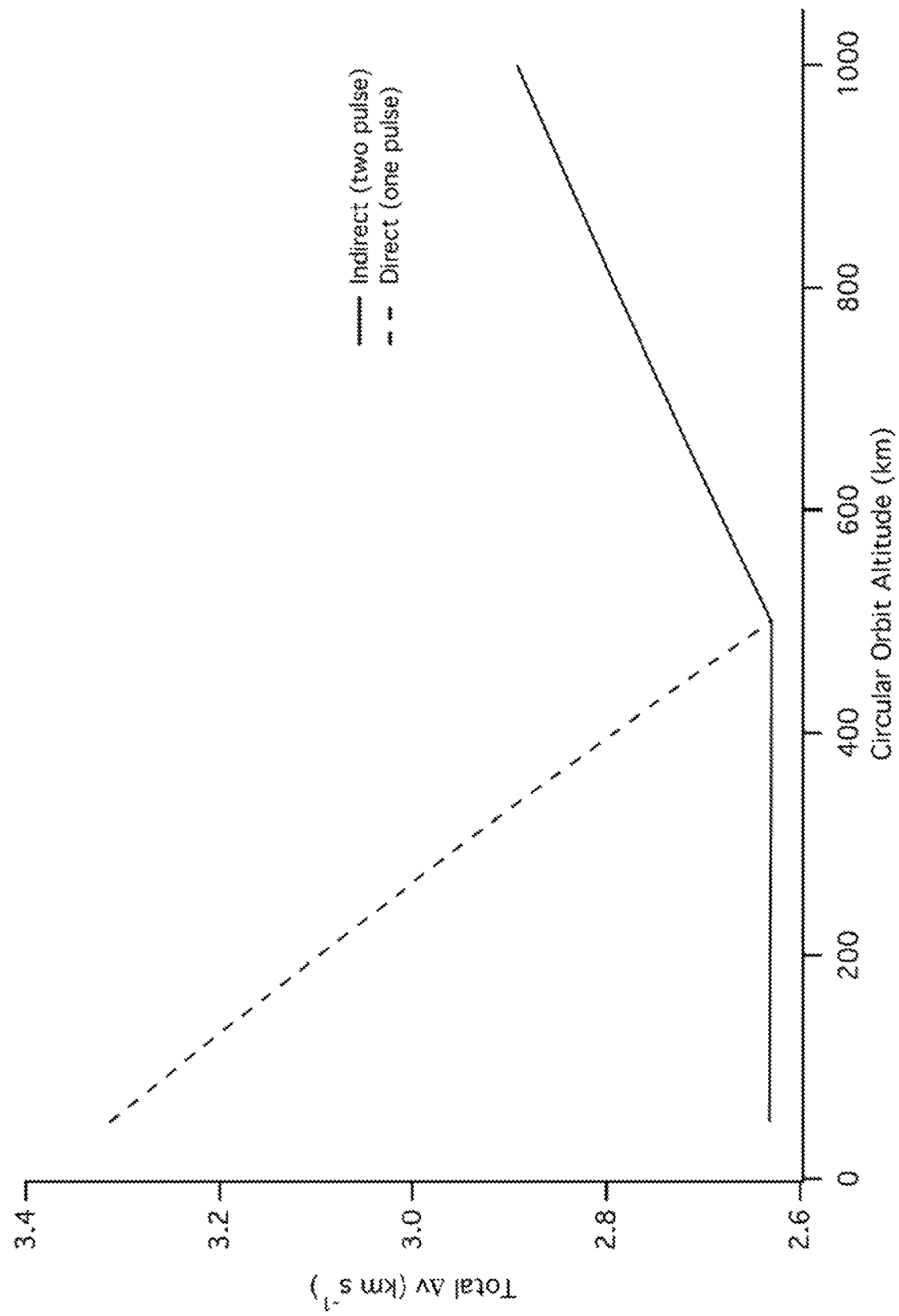

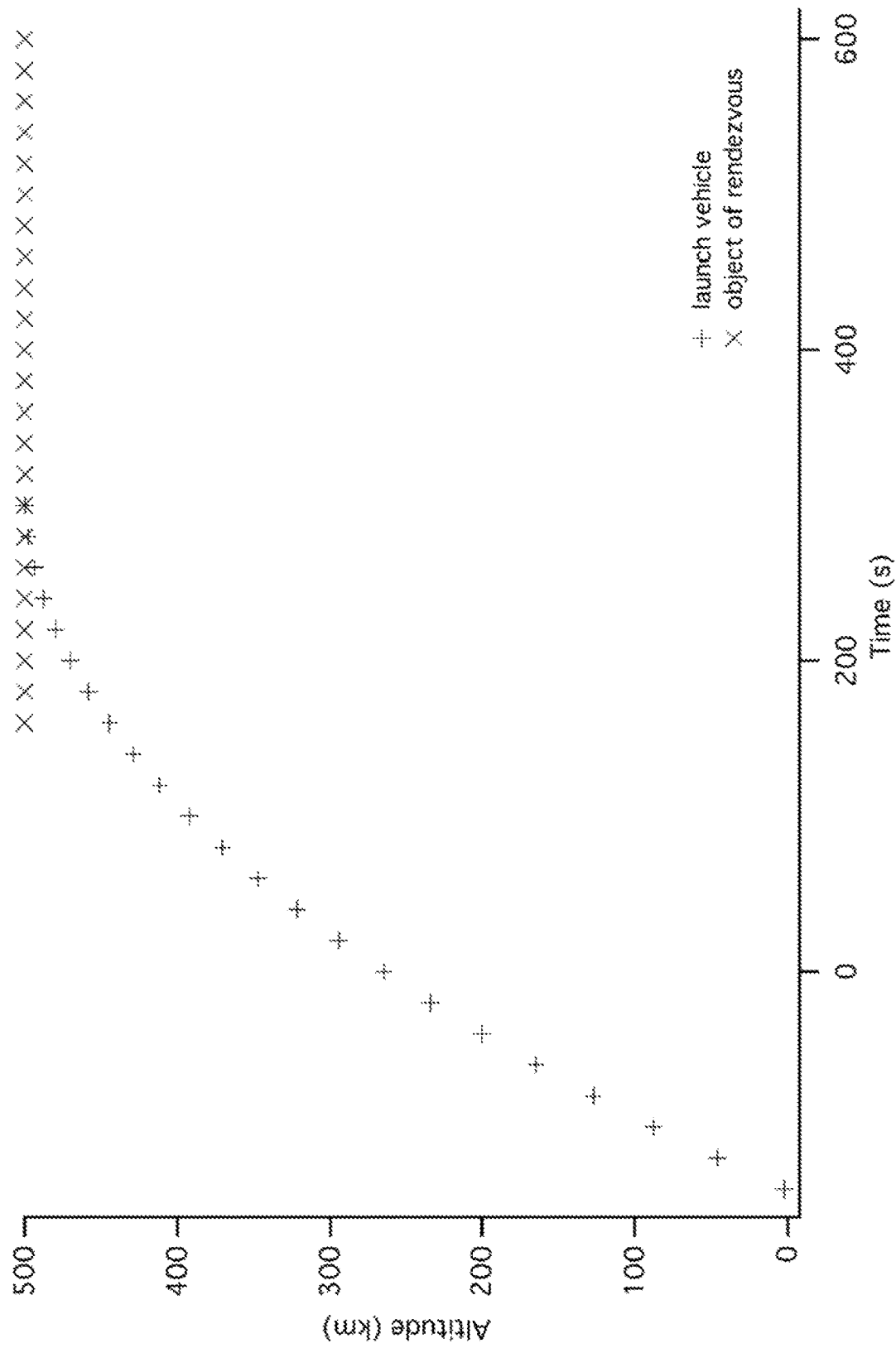

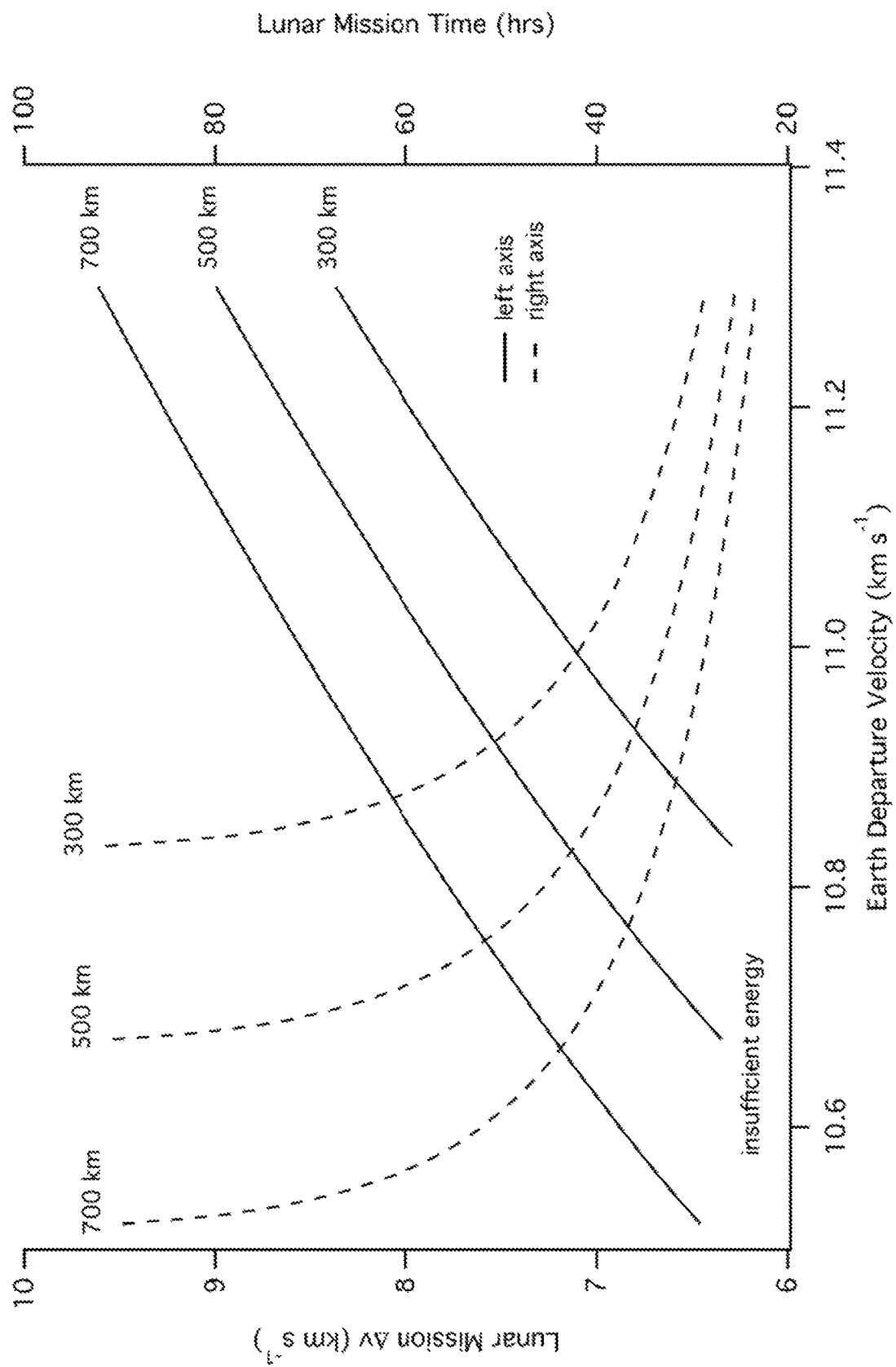

ORBITAL MECHANICS OF IMPULSIVE LAUNCH

CROSS REFERENCE TO RELATED APPLICATIONS

This application is a continuation-in-part of U.S. patent application Ser. No. 15/143,386, filed Apr. 29, 2016, and entitled "ORBITAL MECHANICS OF IMPULSIVE LAUNCH," inventor Harry E. Cartland, which is incorporated by reference herein as if put forth in full below.

BACKGROUND

Expansion of a light gas working fluid, e.g. hydrogen or helium, at high temperature and pressure can accelerate projectiles to great velocity because of the fluid's very high sound speed, which is proportional (in simplest form) to the square root of temperature over molecular or atomic weight.

Prior work with light gas launch has largely focused on development of hardware appropriate to this objective. For example, in U.S. Pat. No. 8,979,033 (2015) and U.S. application Ser. No. 14/659,572 (2015), Hunter et al. disclose sea and land-based light gas launcher variants for space launch applications. In U.S. application Ser. No. 14/642,720 (2015), Cartland describes the conditioning of the requisite large mass of light gas to high temperature and pressure using a heat exchanger, i.e. without relying on adiabatic compression. In U.S. Pat. No. 8,536,502 (2013) and U.S. Pat. No. 8,664,576 (2014), Hunter et al. disclose spinning and non-spinning space launch vehicles designed for hypersonic impulsive launch, atmospheric egress, and orbital insertion.

In contrast to the prior hardware oriented work discussed above, the emphasis here is on methods, specifically the efficient orbital mechanics or astrodynamics of orbital launch and rendezvous, as well as beyond Low Earth Orbit (LEO) missions. Although developed for light gas launchers, the methods disclosed apply more generally to many impulsive space launch concepts, including electromagnetic launchers, powder guns and more exotic technologies.

A light gas launcher might at first appear somewhat constrained by its size (and hence orientation) to a limited range of applications, but this is not true. A mobile sea-based launcher can be moved to just about any launch latitude, and combined with flexibility in azimuth, can access the full range of orbital inclinations efficiently. In addition, both launch elevation and muzzle velocity can be adjusted to service any orbital altitude efficiently. So a sea-based launcher is extremely agile in its ability to address a wide range of missions, no more kinematically constrained than a conventional rocket.

A land-based launcher is somewhat less agile, being limited by launch site latitude and launcher orientation to fixed inclination (or a narrow range of inclination), though still commanding some flexibility in altitude. Even so, this isn't necessarily a shortcoming for certain applications if the launcher is properly matched to the mission, as will be discussed later.

SUMMARY OF THE INVENTION

The invention provides various methods of launching a vehicle using an impulsive force as applied by e.g. a light-gas gun, powder gun, electromagnetic launcher (e.g. coil gun), or other launcher that provides an impulsive force, examples of which are provided below.

In one instance, the invention provides a method of launching a vehicle to orbit around the Earth. An impulsive force launches the vehicle in a direction that is easterly or due east, and the vehicle ascends along a trajectory that defines an elliptical path having an apogee and a perigee. The launch direction for the vehicle is also in a plane that corresponds to the elliptical orbital path of the vehicle.

The invention also provides a method of closing a timing difference between a vehicle launched using an impulsive force and a satellite of interest or a desired vehicle location that was not yet attained. A series of forces is applied to the vehicle post-launch to provide a change in vehicle velocity $\Delta v$ that is divided into a first $\Delta v$ increment and a second $\Delta v$ increment. A first force of the series of forces provides the first $\Delta v$ increment and temporarily places the vehicle into a first orbit having a first orbital period that is significantly different from an orbital period of the satellite or the desired vehicle location. This reduces a time difference between the vehicle and the satellite or the desired vehicle location in an integer number of orbits. A second force of the series of forces provides the second $\Delta v$ increment, and the second force is sufficient to establish the vehicle in a circular orbit with the satellite or the desired vehicle location.

Further, the invention provides a method for a vehicle launch from a first celestial body (such as the Earth) to a second celestial body (such as Mars). The method comprises using an impulsive force to launch the vehicle and establish a first path for the vehicle. The method also comprises applying a second force to the vehicle along a hyperbolic path that takes the vehicle from the first celestial body to the second celestial body, where the vehicle attains a circular orbit about the second celestial body.

Various advantages and details of these methods are discussed below.

TERMS OF REFERENCE

The analysis described here employs analytic spreadsheets, an analytic rendezvous model, and a full physics rocket code. The spreadsheets are based on a ballistic missile formalism. The rendezvous model iterates a solution to the Kepler problem for the object trajectory, the Gauss problem for the launch vehicle and object, and then the Kepler problem for the launch vehicle fly out, employing a universal variable formalism. The spreadsheets and rendezvous model assume a rotating spherical earth. Both incorporate an analytic drag loss based on an exponential atmosphere and constant drag coefficient, justified on the basis that drag coefficients are flat at hypersonic speeds, the flight regime that obtains throughout. Both also assume instantaneous $\Delta v$, certainly valid for the initial impulsive launch and a reasonable approximation for subsequent motor burns, which are relatively short compared to, mission time. The rocket code integrates the equations of motion and does not employ these approximations, though the more rigorous code results typically vary from the analytic approaches by less than 5% for LEO applications. These tools of analysis work in tandem, the spreadsheets setting up the rendezvous model, which in turn provides input to, and is refined by, the rocket code.

The methods disclosed apply to both land-based and sea-based launchers, although launch is assumed from sea level in the results shown here. Unless otherwise stated, muzzle velocity is 6 km s$^{-1}$, a good light gas launcher working velocity consistent with minimal launch tube erosion. This launch speed also allows the employment of a single stage launch vehicle, important for reducing vehicle cost and complexity (and potential for failure). Operation at a fixed muzzle velocity (or energy) may be advantageous from a mechanical perspective as stresses are also fixed, although variation is easily possible; of course changing muzzle velocity affects mission $\Delta v$ requirement, arguably the most important figure of merit.

For representative launch vehicle properties, unless otherwise stated, the analysis assumes the characteristics of a single stage vehicle designed in earlier work to place a 100 kg class payload in 53 deg inclination, 770 km altitude circular orbit; they are launch mass m=1078 kg (excluding sabot), drag coefficient $C_d$=0.0154 (power law shape with base flare for passive stability), and ballistic coefficient $\beta$=133,610 kg m$^{-2}$.

One of the most basic and useful missions is rendezvous off launch vehicle (vehicle) with an object of rendezvous (object) in LEO. The object may be:
1. a space station to be supplied
2. a depot to be stocked
3. a satellite to be serviced
4. an objective of military interest
5. something more exotic where "something more exotic" could be, for example, an asteroid maneuvered into orbit to be mined. The baseline object for this analysis is in a 51.65 deg inclination, 500 km altitude circular orbit; this would put it about 100 km above the International Space Station (ISS), a reasonable depot location for support of beyond LEO manned space exploration. Of course the object may also orbit another body, e.g. the Moon or Mars.

Basics

Assuming $\Delta v$ is managed efficiently, in rough terms it takes a minimum of about 9 km s$^{-1}$ to reach LEO. Obviously it is possible to manage $\Delta v$ inefficiently and expend more. Of this 9 km s$^{-1}$, about 7.5 km s$^{-1}$ is the circular satellite velocity required to maintain. LEO, and about 1.5 km s$^{-1}$ is lost to drag and gravity.

Direction is important too, not just speed. Conic trajectories short of escape originating at the Earth's surface later re-intersect the Earth. Even if the launcher could supply all the energy required to reach and sustain LEO, a means would still be necessary to change vehicle direction. So impulsively launched vehicles will in general have at least one motor stage, although hypersonic aeromaneuvering using control surfaces is a possibility. With a 6 km s$^{-1}$ muzzle velocity, about 3 km s$^{-1}$ will have to come from the vehicle and elsewhere; under the right circumstances, Earth rotation can assist with several hundred meters per second.

After some perhaps considerable reflection, the most efficient launch will be easterly, directly into the desired orbital plane, with ballistic apogee at the desired orbital altitude. The reasons for this are addressed later. Efficiency is critical in that mass fraction, and hence useful payload, is reduced exponentially in proportion to the amount of $\Delta v$ required from the vehicle.

The baseline orbit (500 km, 51.65 deg) can be reached with a 6 km s$^{-1}$ launch to the east from 51.65 deg north latitude (inclination never less than launch latitude) at an elevation (initial flight path angle) of about 24 deg. Although irrelevant to the kinematics, a launch longitude of 170 deg west places the launch location in the Aleutian Islands, a potential basing site for both land and sea-based launchers. Under these conditions the vehicle must supply only about 2.63 km s$^{-1}$, with an additional 0.29 km s$^{-1}$ deriving from Earth rotation.

What do these representative numbers mean? The conventional launch paradigm requires all of the $\Delta v$ from the vehicle, which entails expensive, complex multistage rockets comprising mostly, engines and fuel, typically used once and then dumped in the ocean.

In contrast, impulsive launch at sufficient speed requires a relatively small vehicle $\Delta v$ that can be obtained with a single stage, making for a less expensive, less complex, more reliable vehicle. Further, a small $\Delta v$ allows a payload fraction of 2-3 tens of percent rather than the 2-3 percent typical of conventional launch vehicles, even allowing for mass penalties associated with g-hardening and thermal protection. Most of the LEO velocity requirement comes from a reusable launcher (ground facility) whose cost is amortized over many launches. All of the foregoing equates to a reduction in specific cost (dollars per kg) to LEO of an order of magnitude relative to conventional expendable multistage launch vehicles. Recurring mission cost is a better metric for small payload launch, and there is a similar comparative cost reduction on that basis as well.

Impulsive launch becomes more cost efficient as the launch rate increases since the capital investment in the facility is spread over more missions. Hence there is an incentive to launch as frequently as possible. Generally, there is only one "most payload efficient" launch opportunity as described above per day. Further, the timing becomes important too if the objective is rendezvous or placing a satellite at a precise point in an orbit, an important consideration returned to later. With some loss in payload efficiency, two launch opportunities present per day by launching from lower latitude, e.g. the equator, although this requires reorientation of the launcher between launches, e.g. from northeast to southeast. Reorientation is facile enough with a sea-based launcher as there may be as many as 12 hrs to accomplish it; land-based launchers are less flexible. The exception is launch from the equator into a zero inclination orbit, where a launch opportunity presents about ever 90 min, or 16 times per day.

BRIEF DESCRIPTION OF FIGURES

Figures contained herein are not necessarily to scale and are provided to better illustrate aspects of the invention.

FIG. 1a shows the required $\Delta v$ for insertion into circular Low Earth Orbits over a range of altitude for a 6 km s$^{-1}$ launch scenario.

FIG. 2b shows a most $\Delta v$ efficient, direct ascent to rendezvous for the baseline case with a 5 min timing difference. The object leads the vehicle.

FIG. 7 shows required vehicle Δv and overall mission time as a function of Earth departure velocity for direct ascent to 150 km Low Lunar Orbit.

FURTHER DESCRIPTION OF PREFERRED EMBODIMENTS

Figure 1B:
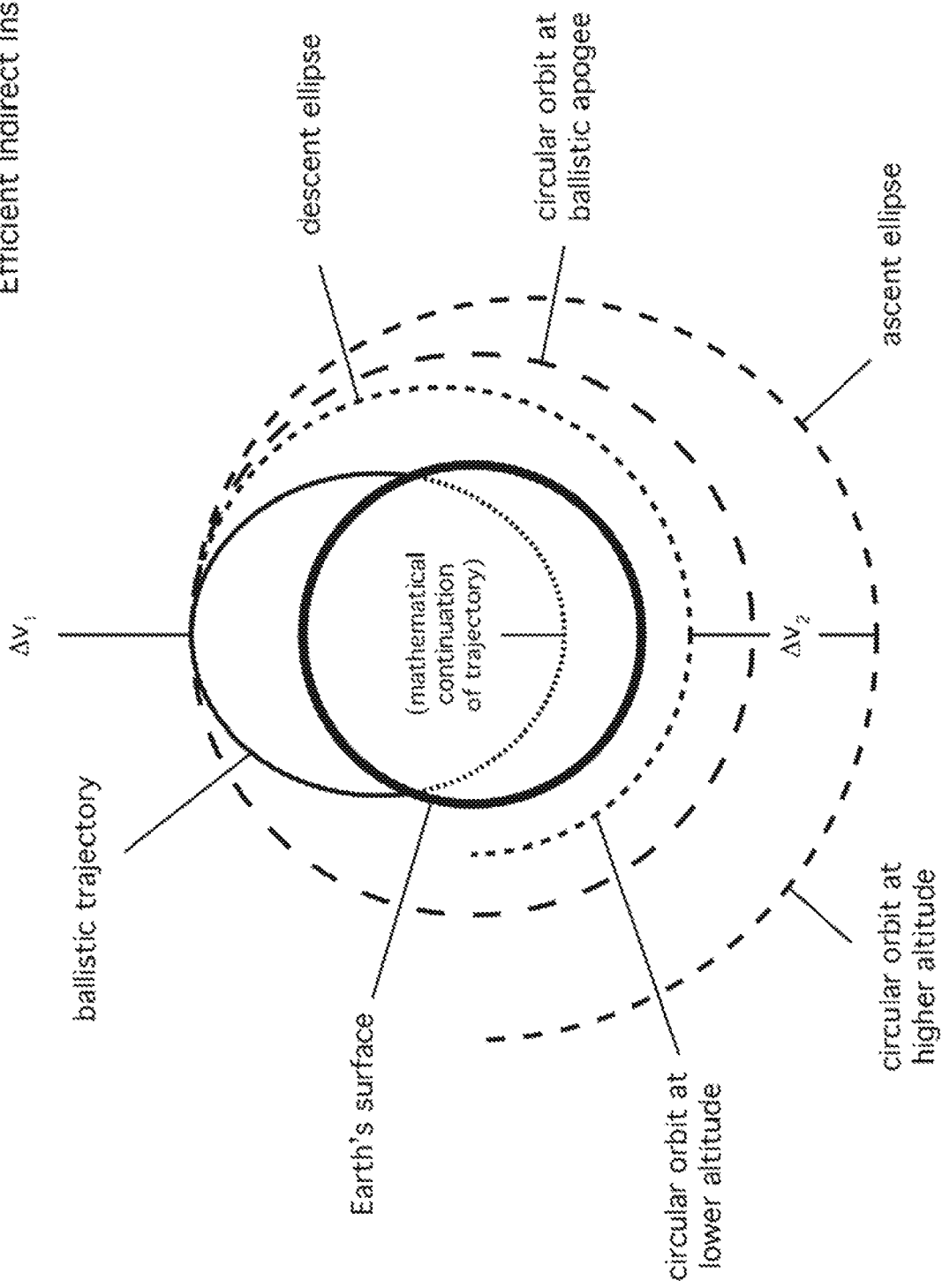
FIG. 1b illustrates the concept of efficient indirect insertion.

Before proceeding with certain refinements, several digressions are helpful. First consider Earth rotation. Although motion is not apparent to an observer in the Earth fixed frame, in the inertial frame Earth rotation adds an easterly component to the launch velocity equal to the tangential velocity of the Earth at the equator (464 m s$^{-1}$) times the cosine of the launch latitude. Hence Earth rotation provides the most assistance for a launch azimuth due east—the easterly component of the Earth fixed launch velocity and the contribution from Earth rotation add as scalars—with increasing contribution as launch latitude decreases toward the equator. Note also that for a launch due east, the orbital plane accessed has an inclination equal to the launch latitude, thus the desirability of an easterly launch from latitude matched to inclination.

Second, consider raising (or lowering) the altitude of an object in LEO. Although there are many ways to accomplish this, it is well known that the most Δv efficient means is by Hohmann transfer whereby a speed increment in the direction of orbital motion puts the object on a transfer ellipse, which is then followed by a second increment about 45 min (half an orbit) later at apogee of the ascent ellipse to match circular satellite speed at the new altitude. (Lowering an orbit proceeds similarly, where the increments are now braking burns, with the second occurring at descent ellipse perigee.) Although Hohmann transfer is the slowest means of changing object altitude, it is very efficient in absolute terms, requiring only about 55 m s$^{-1}$ to effect an altitude change of 100 km in LEO.

In fact, impulsive launch with circularization at ballistic apogee can be understood in the context of Hohmann transfer. The launcher provides the appropriate velocity on an ascent ellipse at the point where it crosses the Earth's surface from a mathematical perigee tangential to a circular orbit well below the Earth's surface. For the baseline case discussed here, that orbit has a radius of 1875 km, or an altitude of −4503 km. Since impulsive launch with circularization at ballistic apogee is effectively a Hohmann transfer, or at least part of one, there can be no more efficient process for reaching a desired orbit altitude.

Third, consider plane change. Plane changes, unlike altitude changes, are expensive with respect to Δv required. For circular orbits, Δv is proportional to satellite velocity, and a plane change of only 1 deg for the baseline case requires about 133 m s$^{-1}$. (Note that this is purely a change in inclination with no change in ascension.) In fact, a plane change of 60 deg requires a Δv equal to circular satellite velocity. Clearly it is highly advantageous to launch directly into the desired orbital plane.

In summary, a launch to the east makes best use of Earth rotation, orbital insertion at apogee is most Δv efficient, and launch directly into the desired plane avoids expensive orbital maneuver. Since additional Δv comes at the expense of dry mass fraction (payload), the most efficient launch will be easterly, into the desired orbital plane, with ballistic apogee matched to desired orbital altitude.

FIG. 1a shows the required Δv for insertion into circular orbits over a range of altitude for the baseline 6 km s$^{-1}$ launch scenario. The solid curve shows a two pulse (burn) indirect insertion process, and the dashed curve a single pulse direct insertion process. The minimum in the solid curve, and the intersection of the solid and dashed curves, correspond to the baseline requirement of 2.63 km s$^{-1}$ for a 500 km circular orbit.

In the indirect insertion the vehicle at apogee can provide a smaller Δv increment than is necessary to circularize, putting it on a descent ellipse to a perigee at lower altitude. A braking burn half an orbit later establishes the vehicle, in an orbit at this lower altitude, and the Δv required is nearly equal to the Δv saved by not circularizing at ballistic apogee. In short there is almost no penalty for entering an orbit lower than ballistic apogee, as reflected in the flatness of the solid curve in this region.

The vehicle can also be flown to a higher orbit than ballistic apogee, but there is no corresponding savings; Δv must be provided at ballistic apogee sufficient to circularize and enter an ascent ellipse, followed by a second burn in the direction of motion half an orbit later to establish the higher orbit. In this case the vehicle pays the full cost of raising the orbit; it must do the work the launcher did not.

Indirect insertion, illustrated in FIG. 1b, is another Hohmann-like transfer and is very efficient. The direct insertion process is far less so as the vehicle must negate some of its ballistic upward velocity component, as well as provide sufficient tangential velocity to sustain the orbit at that altitude. Direct insertion is, however, faster as the indirect process requires two burns approximately 45 min (half an orbit) apart.

FIG. 1a makes an important point. A large, fixed land-based launcher is not so limited as it might first appear, at least with respect to altitude. It can access a range of altitudes very efficiently, even more so if muzzle velocity (i.e. ballistic apogee) is varied, Land-based launchers are not as flexible as re-orientable sea-based systems, which can efficiently access a broad range of inclination as well, but this may not be a drawback under certain scenarios such as stocking a depot where a dedicated launcher is matched to the orbit of the depot.

Figure 2A:
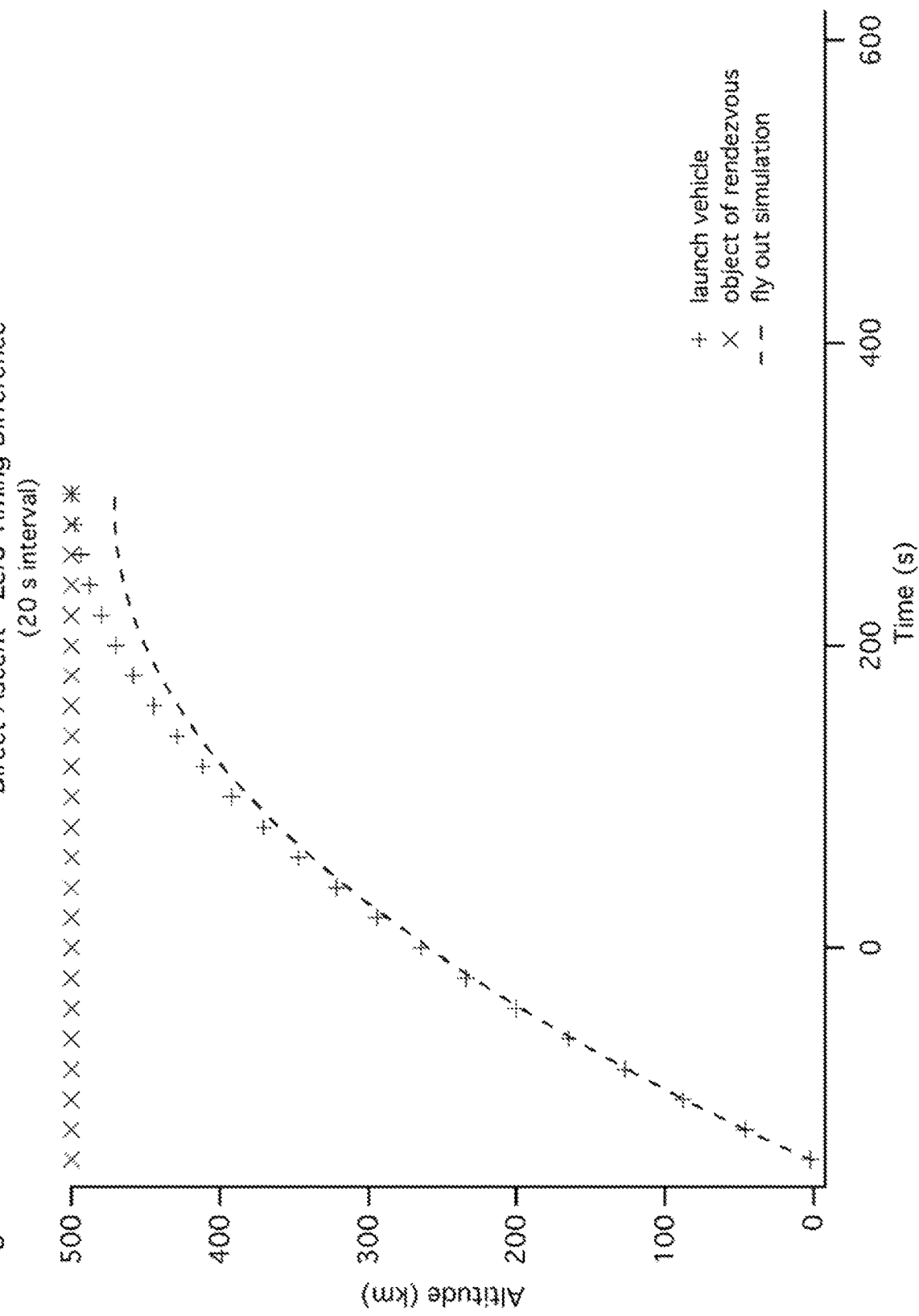
FIG. 2a shows a most $\Delta v$ efficient, direct ascent to rendezvous for the baseline case with zero timing difference.

FIG. 2a shows an ideal, most Δv efficient, direct ascent to rendezvous for the baseline case. The vehicle launches east from 51.65 deg north latitude with ballistic apogee at 500 km altitude. The markers show 20 s intervals and time, zero is (arbitrarily) set to the point at which the object ground track reaches maximum latitude. Note that since the vehicle initially moves more slowly than the object and must ascend to orbit altitude, it must launch well before the object passes (nearly) overhead. At the same time the launch site is rotating to the east, so for the object to arrive over the same point in the inertial frame from which the vehicle was launched, it will have to reach maximum latitude at an Earth fixed longitude slightly to the west of the launch site. The required longitude difference is a function of the lead time of the vehicle and the Earth rotation rate. When optimal, the vehicle goes east into the same plane in the inertial frame as the object, which closes from behind, and the vehicle Δv increment is applied at apogee to match object speed. Practically speaking from a modeling perspective, the rendezvous time, launch time, and launch longitude are iterated to generate a requirement for a 6 km s$^{-1}$ muzzle velocity and east azimuth, where vehicle and object azimuth and flight path angle match at rendezvous, with a speed difference of 2.63 km s$^{-1}$. For the baseline case, the model closes when the vehicle launches at −141 s with rendezvous at +311 s, and with the object ground track about 0.6 deg west of the launch site.

Figure 3:
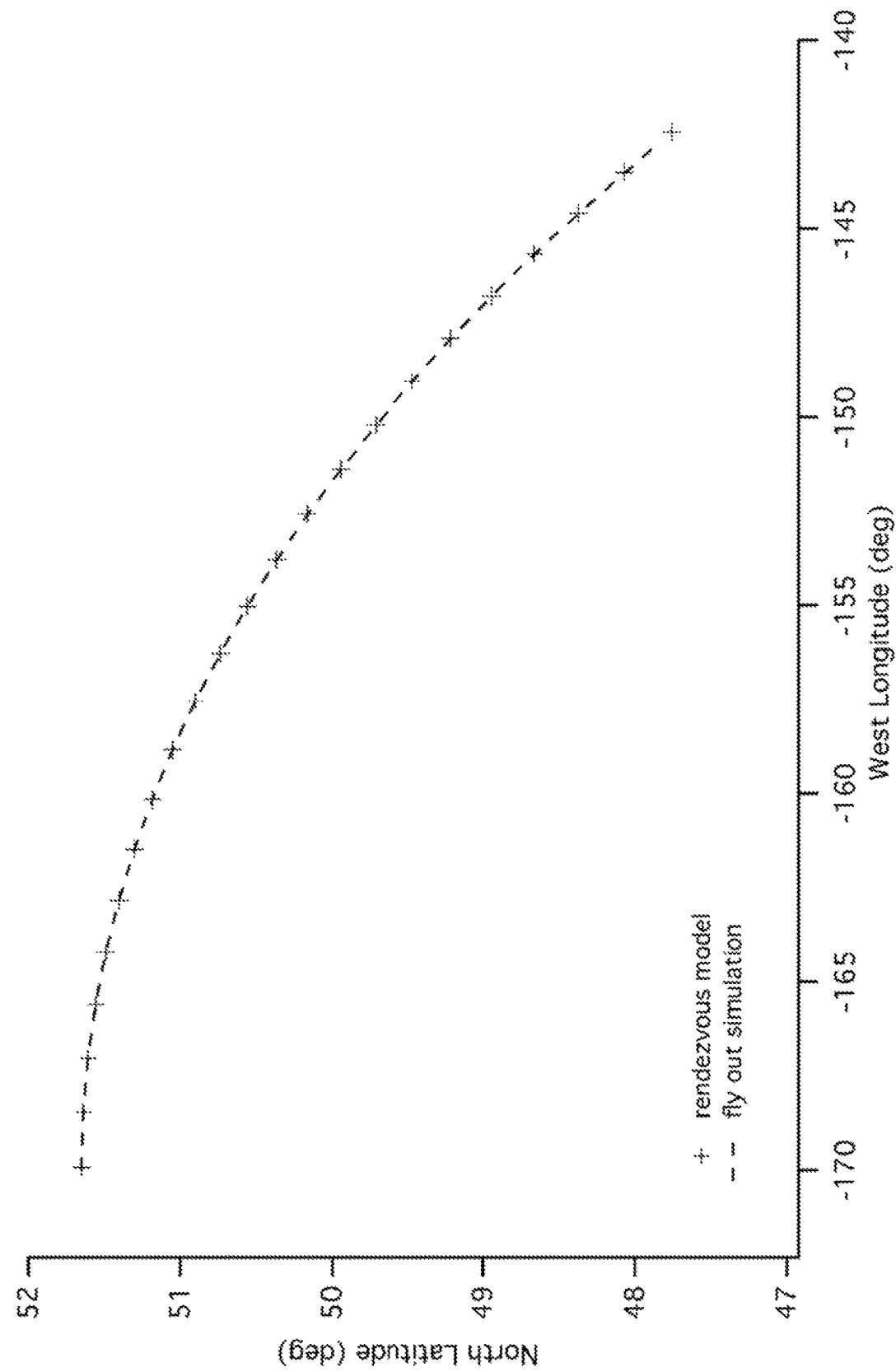
FIG. 3 shows a comparison of the vehicle ground track determined from the model and the rocket code for the baseline case.

Note that the spreadsheet works "forward" from launch, while the model works "backward" from rendezvous. Both approaches are analytic and yield identical results. The dashed line in FIG. 2a is a more accurate vehicle fly out simulation using the rocket code. Although in good agreement, it shows that the analytic techniques over predict apogee altitude by about 5%, almost certainly a result of approximations in computing drag loss. (The error relative to geocentric radius, the actual calculational variable, is much less.) FIG. 3 shows a comparison of the vehicle ground track determined from the model (markers) and the rocket code (dashed line); the agreement is excellent. Although the full physics code is more rigorous, it is less useful than the model for surveying "parameter space," and comparisons indicate the model is accurate enough to be quite useful.

FIG. 2b represents a case when there is a timing difference between the vehicle and object. In this instance, by the time the launch site rotates into position to access directly the object orbit's plane, the object is 5 min ahead of where it should be to effect a most efficient rendezvous. This is not unusual; a timing mismatch is the norm. Since ideal conditions present infrequently, but a high launch rate is desirable for economic and operational reasons, a means must be determined to mitigate timing error.

One method of correcting a timing error is initially to put the vehicle in an orbit whose period differs from that of the object. In the case of FIG. 2b, the object leads the vehicle by 5 min, so the vehicle must complete its orbit(s) faster than the object. Assume the object of rendezvous is in circular LEO. With a first $\Delta v$ increment (burn) at ballistic apogee, insert the launch vehicle in a lower elliptical orbit of shorter period than the object, and then some integer number of orbits later initiate a second burn (at apogee) to put the vehicle in circular orbit in close proximity to the object with zero closing velocity. Specifically, pick the first increment $\Delta v_1$ such that the tinting mismatch $\Delta T$ is $$\Delta T = N(T_{cs} - T) \quad \text{Eqn. 1}$$

where $T_{cs}$ is the circular satellite period of the object, T is the period of the elliptical orbit of the vehicle, and N is an integer number of orbits required to close the gap. It can be shown that the required $\Delta v_1$ is $$\Delta v_1 = -v_{ba} + v_{cs}\left[2 - (NT_{cs}/(NT_{cs} - \Delta T))^{\frac{2}{3}}\right]^{\frac{1}{2}} \quad \text{Eqn. 2}$$

where $v_{ba}$ is the speed at ballistic apogee and $v_{cs}$ is the circular satellite speed. The second velocity increment $\Delta v_2$ is simply the balance of the $\Delta v$ that would have been required to circularize at initial ballistic apogee, $$\Delta v_2 = v_{cs} - v_{ba} - \Delta v_1 \quad \text{Eqn. 3}$$

so this method is no less efficient (to first order) than the ideal timing case of FIG. 2a.

Figure 4A:
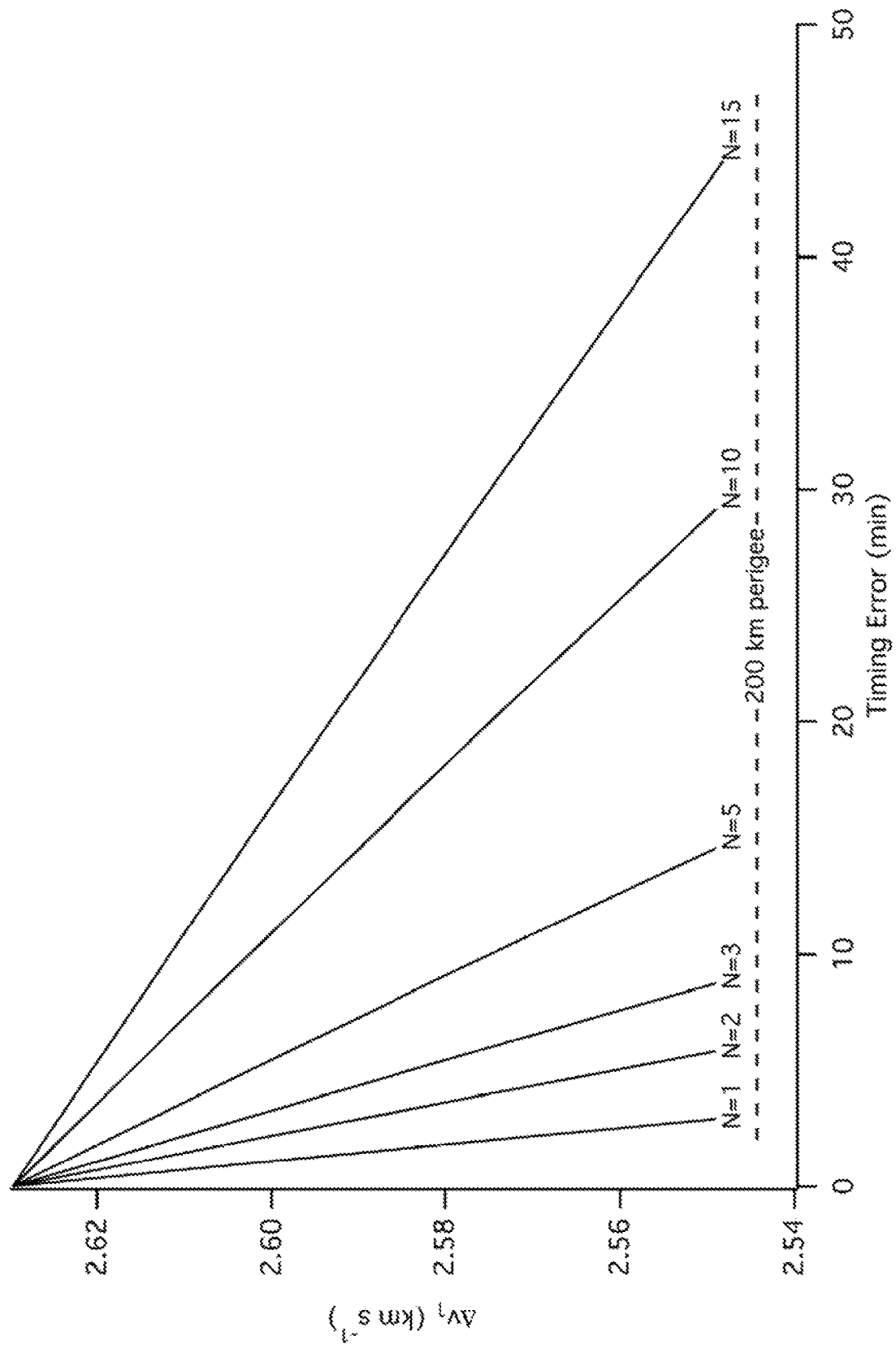
FIG. 4a shows the required first burn $\Delta v$ increment to correct a timing error in integer N orbits for the baseline case when the object leads the vehicle.

FIG. 4a shows the required $\Delta v_1$ for the baseline case to correct timing error in N orbits for up to half an orbital period. The curves are cut off at 2.544 km s$^{-1}$ since an initial $\Delta v$ increment less than this amount will put the vehicle on a descent ellipse with perigee under 200 km. Although this limit is somewhat arbitrary, drag on the vehicle in die upper atmosphere becomes significant if it drops too low, and the vehicle will not return to ballistic apogee. FIG. 4a, or Equation 2, shows that the 5 min timing error of FIG. 2b can be corrected in two orbits with $\Delta v_1 = 2.561$ km s$^{-1}$, or in five orbits with $\Delta v_1 = 2.602$ km s$^{-1}$, or in fifteen orbits with $\Delta v_1 = 2.621$ km s$^{-1}$. Closing the gap in fewer orbits puts $\Delta v_1$ on a steeper curve, making rendezvous more sensitive to errors in burn time, although it will be faster. On the other hand, closing the gap in more orbits allows any errors or perturbations to grow for longer. So there will be some compromise, perhaps five orbits in this instance.

Up to this point the focus has been on the instance where the object leads the vehicle and the latter must catch up. It is also possible that the launch site rotates into position to access directly the object orbit's plane too early, and the vehicle will lead the object. Using a similar method, the vehicle can also fall back with a first $\Delta v$ increment greater than that required to circularize, putting the vehicle in an ascending elliptical orbit with a longer period than the object, followed after an integer number of orbits with a second braking $\Delta v$ increment at ballistic apogee (ellipse perigee), to circularize in proximity to the object. For "falling back" the vehicle pays a $\Delta v$ penalty, unlike the case of "catching up," though this may be acceptable in time critical missions. One solution for the mission of stocking LEO depots is to have multiple depots in the same orbit, so that there is always one in fairly close proximity to which to catch up, rather than expending fuel to fall back. Note that the emphasis of this discussion has been vehicle rendezvous with an object, but the same methods of course also apply to, for example, simply positioning an impulsively launched payload at some specific location in an orbit.

Note that in the derivation of Eqn. 2 above, $\Delta T$ was chosen as positive for the case where the object leads the vehicle. In the instance where the vehicle leads the object, $\Delta T$ is negative and the second $\Delta v$ increment is a braking burn with magnitude the negative of that shown in Eqn. 3.

Figure 4B:
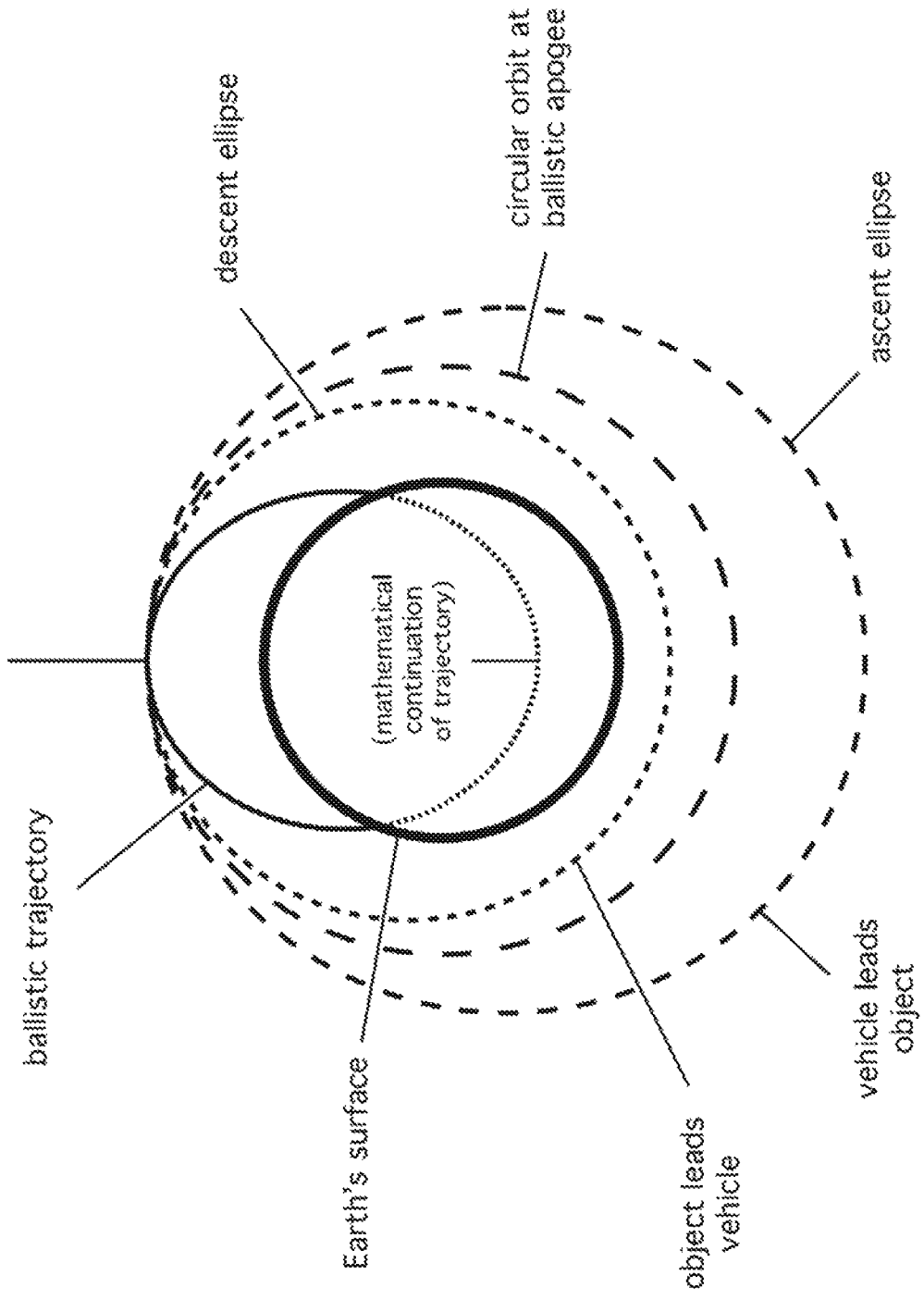
FIG. 4b illustrates the concept of efficient timing correction.

FIG. 4b illustrates the concept of efficient timing correction as may be applied to various methods discussed herein.

The discussion of timing correction to this point has addressed the most efficient scenario(s) wherein vehicle ballistic apogee matches the orbital altitude of the object or desired vehicle location. Less efficient variations are possible, including those that vary muzzle velocity as a launch parameter.

In the case where the launch opportunity comes too soon, e.g. the launch site rotates into the plane of the intended orbit early, the muzzle velocity can be increased to reach a ballistic apogee at an altitude above the intended orbit. At ballistic apogee, a first $\Delta v$ increment places the vehicle into a descending elliptical orbit with perigee at the altitude of the object orbit or the desired location. The vehicle remains in this longer orbit for N+½ orbits (N=an integer) until the object or desired location catches up, with the vehicle, at which point a second $\Delta v$ is applied at elliptical orbit perigee to establish the vehicle in orbit in close proximity to the object or location. Here, the second $\Delta v$ is a braking burn.

In the case where the launch opportunity comes too late, e.g. the launch site rotates into the plane of the intended orbit late, the muzzle velocity can be decreased to reach a ballistic apogee at an altitude below the intended orbit. At ballistic apogee, a first $\Delta v$ increment places the vehicle into an ascending elliptical orbit with apogee at the altitude of the object orbit or the desired location. The vehicle remains in this shorter orbit for N+½ orbits (N=an integer) until the vehicle catches up with the object or desired location, at which point a second $\Delta v$ is applied at elliptical orbit apogee to establish the vehicle in orbit in close proximity to the object or location. Here, the second $\Delta v$ is in the direction of vehicle motion.

These variations correct a timing error, but are less attractive than the baseline scenario(s) discussed previously, and illustrated in FIG. 4b. In the first instance, the launcher provides excess kinetic energy, and a braking burn is eventually required to dispose of some of it. In the second instance the launcher does not provide the optimal kinetic energy, and the deficit is made up through expenditure of vehicle propellant. Additional variations involving multiple burns and muzzle velocity as a parameter are also conceivable.

Now consider some finer points and variations.

Because of the Earth's oblateness—it bulges about 21 km at the equator—an object's orbital plane precesses from gravitationally induced torque. This nodal regression westward (eastward for a retrograde orbit) amounts to about −5 deg per day for an object in a direct orbit at 52 deg inclination and 500 km altitude, it means that the opportunity to access directly (and most efficiently) the object's plane comes about 20 min sooner every day.

It was earlier mentioned that launching from latitude lower than the most $\Delta v$ efficient baseline case would offer two opportunities per day to access, directly the object plane if the launcher can be reoriented. Consider the object ground track for the baseline case. It crosses the equator off the east coast of Sumatra (ascending node) and off the coast of Ecuador, between the mainland and the Galapagos. (Both of these locations might be suitable for a sea-based launcher, although the down ranges at the required azimuths may leave something to be desired.) In the former instance, an efficient rendezvous could have been accomplished with a 6 km s$^{-1}$ muzzle velocity at an Earth fixed azimuth of 34.2 deg with launch and rendezvous times of −1561 s and −1109 s, respectively. The latter instance would have required an azimuth of 145.8 deg with launch and rendezvous times of +1278 s and +1729 s, respectively. Both instances would require only slightly more $\Delta v$ at apogee (+13 m s$^{-1}$) than baseline, i.e. 2.64 km s$^{-1}$. The precise launch site longitude is immaterial as long as timing correction is possible, and a single launcher at the equator will rotate into the object orbital plane at both its ascending and descending nodes every day. Thus a single launcher will have two launch opportunities a day, 12 hrs apart, to access the object plane with a reorientation through 111.6 deg between (from northeast to southeast or vice versa)

Further Refinements

Not only is it necessary to determine parameters for most efficient launch, it is also important to understand how excursions from the ideal affect performance. How fast does the vehicle $\Delta v$ requirement rise from the baseline case when rendezvous timing is not optimized? What does it mean to be "early" or "late"? There are (at least) two answers to these questions. The rendezvous may be early or late with respect to the optimum rendezvous point in space and time. Or the vehicle may launch early or late for rendezvous at the optimum point. (Or both may be true.) Examine these separately.

Figure 5:
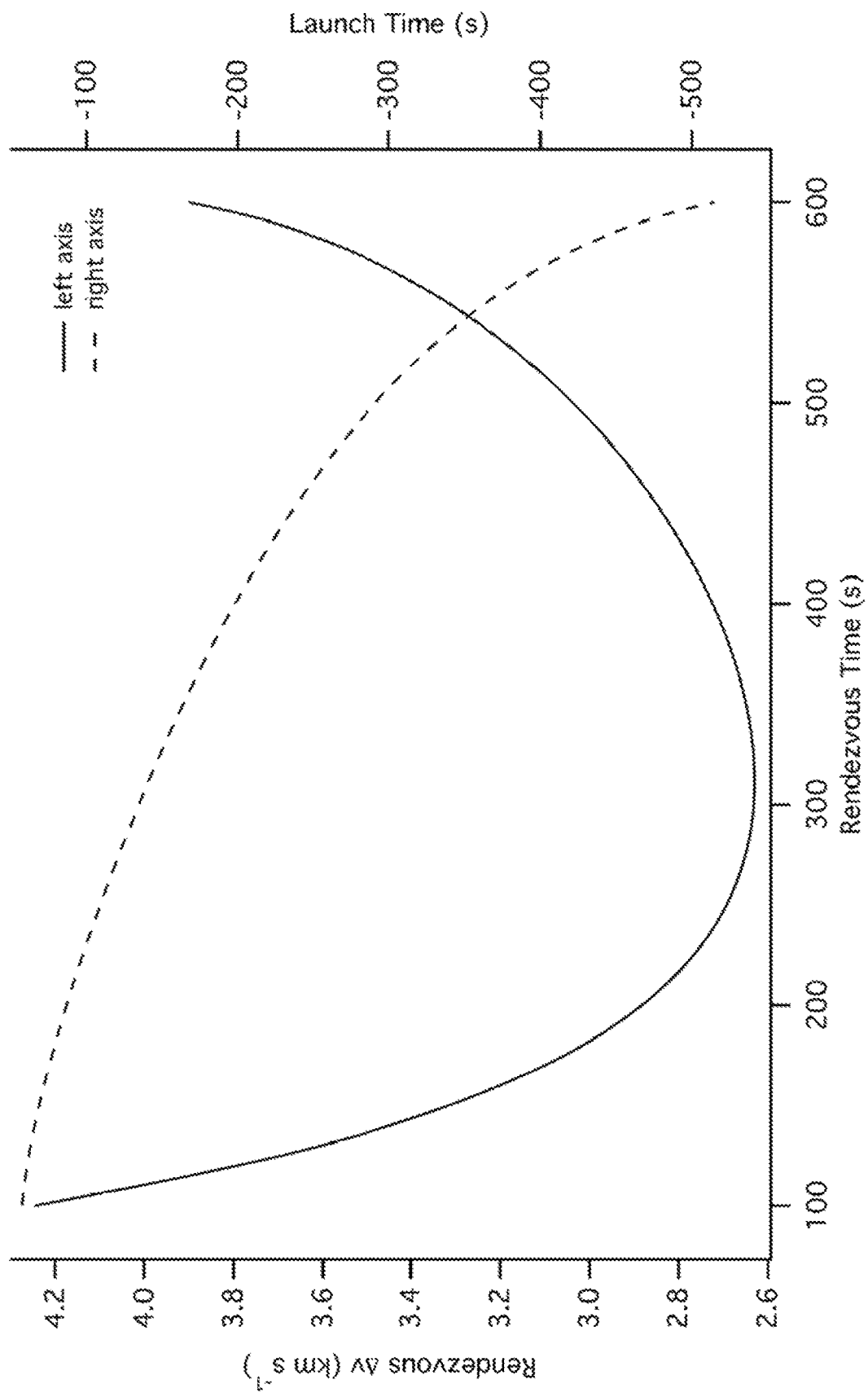
FIG. 5 shows required vehicle $\Delta v$ and launch time versus rendezvous time for variation about the baseline case.

First consider the effect on $\Delta v$ for rendezvous at object position and time other than optimum. FIG. 5 shows required vehicle $\Delta v$ (solid curve) and launch time (dashed curve) versus rendezvous time. The minimum in the solid curve at 2.63 km s$^{-1}$ corresponds to the baseline case with launch at −141 s and rendezvous at +311 s. Because muzzle velocity is fixed at 6 km s$^{-1}$, early rendezvous allows a later launch time as the vehicle has less distance to cover to the rendezvous point, and the vehicle arrives at rendezvous with positive flight path angle. Conversely, late rendezvous requires an earlier launch and more lofted fly out trajectory, and the vehicle arrives at rendezvous with negative flight path angle. For very late rendezvous times (t>562 s), corresponding to very early launch times (t<−388 s), the flight path angle at rendezvous is below the angle to the horizon and the vehicle approaches the object against the background of Earth; in this circumstance "earthshine" could make rendezvous more challenging, especially if the object is not cooperative. The solid curve is fairly broad near minimum and consequently deviation in rendezvous position of tens of seconds, perhaps 100 s, requires no significant increase in vehicle $\Delta v$.

Now consider the second type of timing deviation, where the vehicle launch time varies from that necessary to yield the most efficient rendezvous, but with rendezvous at the optimum point. If the vehicle is launched early or late with fixed muzzle velocity, it will have too much or too little energy to arrive at the rendezvous point at the correct time. So there are essentially two $\Delta v$ increments required, one to correct the launch speed to ensure the vehicle arrives at the proper point in space and time, and the second to match speed and direction with the object at the rendezvous point.

Figure 6A:
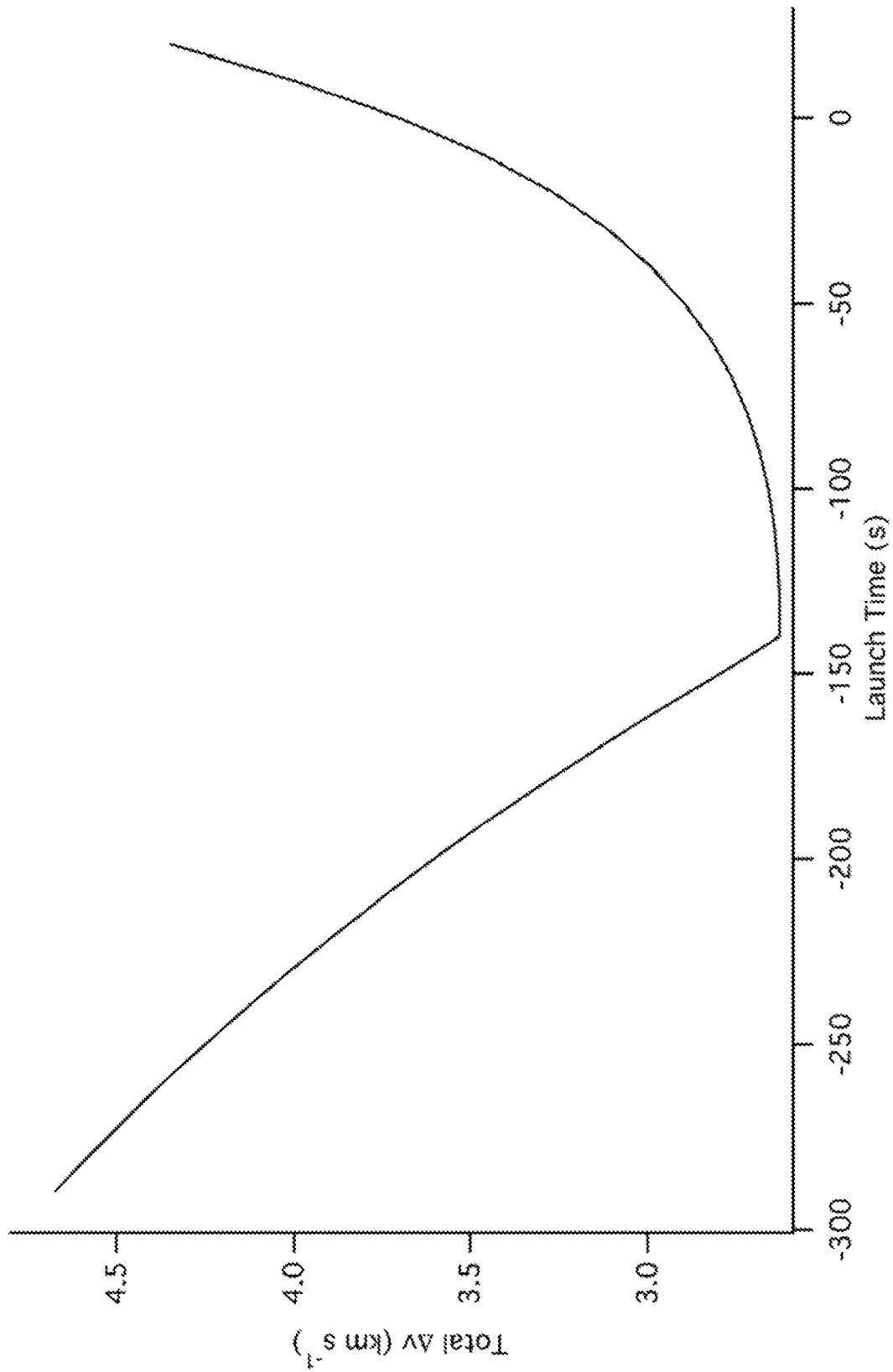
FIG. 6a shows the required total vehicle $\Delta v$ versus launch time for rendezvous at the baseline rendezvous point.
Figure 6B:
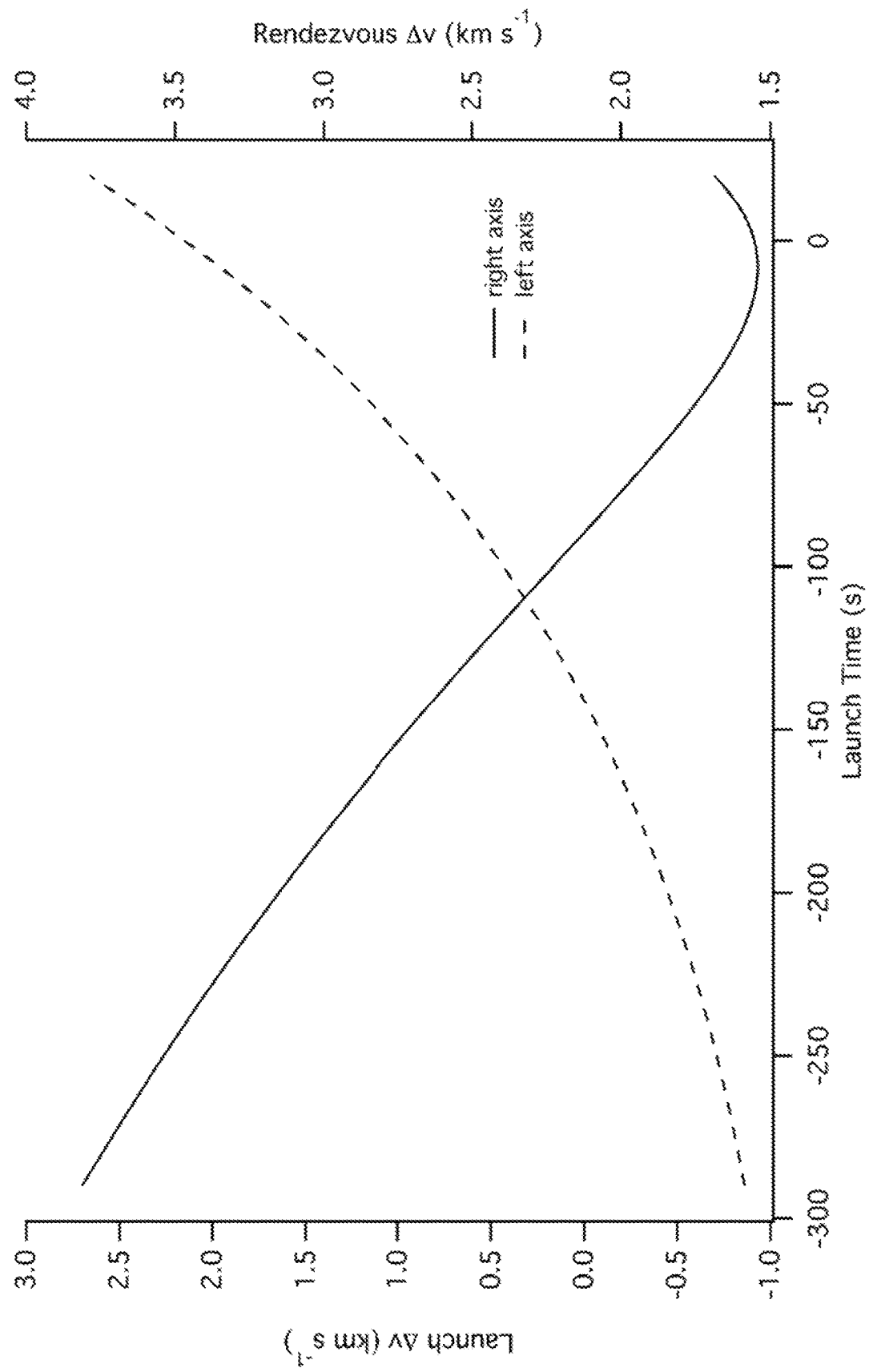
FIG. 6b breaks the total $\Delta v$ requirement shown in FIG. 6a into launch and rendezvous increments.

FIG. 6b shows both vehicle $\Delta v$ increments versus launch time, the launch $\Delta v$ as a dashed curve and the rendezvous $\Delta v$ as a solid one, (The launch $\Delta v$ is assumed to be applied early, but outside the atmosphere where drag can be neglected.) An early launch (t<−141 s) requires some braking so as not to arrive at the rendezvous point too soon, while a late launch (t>−141 s) requires augmentation of the muzzle velocity to arrive in time. The dashed curve reflects this, where $\Delta v$ for early launch is negative and, for late launch positive. (Of course the sign only signifies direction, and it is the absolute value that determines vehicle $\Delta v$ requirement.)

Now consider the rendezvous $\Delta v$ (solid curve). For early launch, since the vehicle is braked so as not to arrive too soon, significant $\Delta v$ (close to 4 km s$^{-1}$ for launch at −290 s) is required at rendezvous to match object speed. Conversely for late launch, since muzzle velocity is augmented to arrive in time, the vehicle carries more speed to the rendezvous point, and less $\Delta v$ is then required to match object speed. For the most part, geometry at rendezvous is not much of a factor. For the range of launch time considered in FIG. 6b, vehicle and object azimuth match closely at rendezvous, with some modest variation in flight path angle. The exception is at very late launch time, when the vehicle arrives with speed comparable to the object and flight path angles deviate, requiring some $\Delta v$ expenditure simply to correct direction; this causes the upturn in the rendezvous $\Delta v$ curve starting at about −20 s.

FIG. 6a shows the total vehicle $\Delta v$ requirement versus launch time, i.e. the sum of the absolute values of the components in FIG. 6b. The minimum of this "checkmark" curve again corresponds to the baseline requirement of 2.63 km for most efficient rendezvous. It is fairly broad as well and illustrates tolerance to deviation in launch tune of many tens of seconds.

Beyond LEO

The focus to now has been Earth orbit. In addition, impulsive launch can enable beyond LEO space exploration by, for example, staging materials in Low Lunar Orbit (LLO) or Low Mars Orbit (LMO). By far the largest mission mass requirement for manned exploration of these destinations is propellant, and pre-staging it reduces mission risk. Other essential commodities are compatible with impulsive launch as well, as are other types of payloads.

Consider first direct ascent from the Earth's surface to a direct LLO at 150 km (positive specific angular momentum). Although absence of an atmosphere would seem to allow lower LLOs, below about 100 km they are unstable due to gravitational perturbations (with the exception of certain "frozen orbits" at specific inclinations). Assume a coplanar trajectory in the analytic patched conic approximation with the Laplace criterion defining the transition point from the Earth's to the Moon's sphere of influence. At a patch point, the vehicle state vector is matched in two different reference frames, in this instance geocentric and selenocentric. The patched conic approximation provides good estimates of mission requirements, although trajectory details are less accurate than for codes that integrate the three-body equations of motion because the vehicle moves for a period under significant influence of the Earth and the Moon simultaneously. An Earth departure velocity at LEO altitude of less than about 10.6-10.9 km s$^{-1}$ leaves the vehicle with insufficient energy to reach lunar orbit and it falls back toward Earth. Hence departure speed is close to Earth escape velocity (11.2 km s$^{-1}$) and a possible no return trajectory. Also, with the Moon's high tangential velocity (>1 km s$^{-1}$) and low escape velocity (2.4 km s$^{-1}$), lunar approach speeds are relatively fast. Consequently, departure trajectories may be hyperbolic, while arrival trajectories are almost certainly so. Any excess vehicle energy—that above minimum energy—requires more $\Delta v$ at departure and more braking on lunar arrival, making the trajectory more expensive on both ends, but the mission time is shorter.

FIG. 7 shows required vehicle $\Delta v$ (solid curves) and overall mission time (dashed curves) from launch to 150 km LLO insertion, as a function of Earth departure velocity. The plots assume the baseline 6 km s$^{-1}$ muzzle velocity with ballistic apogees at 300, 500 (baseline) and 700 km, corresponding to initial flight path angles (Earth fixed launch elevations) of about 18, 23 and 28 deg, respectively. Earth departure occurs from near ballistic apogee at zero flight path angle, making most efficient use of departure $\Delta v$. Launch azimuth is due east from 23 deg north latitude, giving a representative inclination at the midpoint in the range of the natural variation of the Moon's orbit relative to the equator (18.2 to 28.5 deg with 18.6 yrs period).

A minimum lunar mission $\Delta v$ of 6.3-6.4 km s$^{-1}$ is required and is for the most part insensitive to departure altitude, a simple reflection of conservation of energy. Starting lower in the Earth's gravity well requires a higher departure velocity, but more tangential velocity is available at ballistic apogee; these considerations offset. The minimum Earth departure $\Delta v$ is 5.5-5.6 km s$^{-1}$, while LLO insertion requires about 0.8 km s$^{-1}$ for braking. Additional $\Delta v$ reduces mission time, very dramatically at first as the initial steepness of the dashed curves illustrates.

Overall performance appears to slightly favor lower departure altitude insofar as it initially yields a shorter time-of-flight for the incremental amount of $\Delta v$ expended. For example, a mission $\Delta v$ of 7 km s$^{-1}$, about 0.7 km s$^{-1}$ above the minimum, leads to mission times of about 44, 46 and 49 hrs for departures at 300, 500 and 700 km, respectively.

The most efficient means of travel from Earth to Mars is by Hohmann transfer in the heliocentric frame, but that also has the longest time-of-flight of any possible successful trajectory, and requires a very specific Earth departure phase angle such that Mars arrives at a sweep angle of $\pi$ rad at the same time as the vehicle. A more general trajectory, and one with a shorter time-of-flight is one that crosses the orbit of Mars at some sweep angle less than $\pi$ rad.

Many of the considerations applying to a Moon mission also apply to one to Mars. In this case, the vehicle moves first primarily under the influence of the Earth, second under the influence of the sun, and finally under the influence of Mars. So the patched conic approximation will now have two patch points, first at the transition between the geocentric and heliocentric frames, and second between the heliocentric and areocentric frames. The assumption is that the vehicle departs the Earth's sphere of influence in the direction of the Earth's motion in the heliocentric frame (most efficient), and the departure velocity consists mostly of the Earth's mean tangential velocity about the Sun (29.8 km s$^{-1}$). Mission $\Delta v$ requirement and time-of-flight can be characterized in terms of hyperbolic excess velocity, the residual speed in the geocentric frame after the vehicle has escaped Earth; in theory this point is at infinity, though in practice is usually some sufficiently large distance from Earth, e.g. 1.5 million km. Earth departure trajectories are of course hyperbolic since with eccentricity less than one the vehicle would never escape the Earth. In contrast, heliocentric transfer trajectories are almost certainly elliptical as an eccentricity greater than one would imply sufficient energy to escape the solar system, Mars arrival trajectories, like their lunar counterparts, are hyperbolic. Finally, the Earth departure phase angle is an important parameter as the synodic period for Mars is 2.13 yrs, and a missed opportunity entails a long wait for the initial conditions of a trajectory to repeat.

The Moon has a very slow rotation rate (period of 27.3 days), which when coupled with its moderate radius (1738 km) means that there is no great advantage to a station or depot in a direct orbit versus one in retrograde from the perspective of rotational assist on ascent from the surface. Mars is different. The rotation period of Mars is comparable to that of Earth (1,026 days), and though its radius is more modest (3380 km), the two coupled together lead to a tangential velocity at the Martian equator of 241 m s$^{-1}$. So the rotation of Mars can provide substantial assistance to a vehicle leaving its surface, especially considering that Mars escape velocity is only 5.0 km s$^{-1}$. In fact, tangential velocity at the equator is a larger fraction of escape velocity for Mars (4.8%) than for Earth (4.2%). Hence for Mars, a station or depot will most likely occupy a direct rather than retrograde orbit, i.e. have positive specific angular momentum.

Another consideration for a Mars station or depot concerns altitude. For Earth, the baseline LEO altitude was 500 km, putting it 100 km above 1 SS. The Moon, lacking an atmosphere, allows a much lower altitude, e.g. LLO at 150 km. For Mars, although there are many factors to consider, LMO at 350 km is stable and puts a potential station or depot safely above the ionopause, mitigating potential problems for electronics. This is the representative altitude adopted here.

The assumption is that the vehicle starts its interplanetary trajectory in the ecliptic plane. Since the Earth is inclined 23.4 deg to the ecliptic, a most efficient launch is east from 23.4 deg north latitude or 23.4 deg south latitude. The departure altitude, i.e. ballistic apogee, is 300 km, which requires an Earth fixed initial flight path angle of about 18 deg for a baseline muzzle velocity of 6 km s$^{-1}$.

There are three significant components to the mission $\Delta v$. Most of the required $\Delta v$ is expended at injection and starts the vehicle on its trajectory to Mars. And as in the lunar case, braking is necessary for insertion into LMO. However, there is a third significant $\Delta v$ requirement in this case: that for plane change from the ecliptic to that of Mars. For most of the planets in the solar system, these plane changes are small, but because the transfer velocities involved are large, the Δv can be significant. The necessary 1.85 deg plane change is most efficiently executed at a transfer trajectory true anomaly π/2 rad short of arrival. Of course there are very likely other smaller Δv requirements to, for example, make course corrections.

Figure 8:
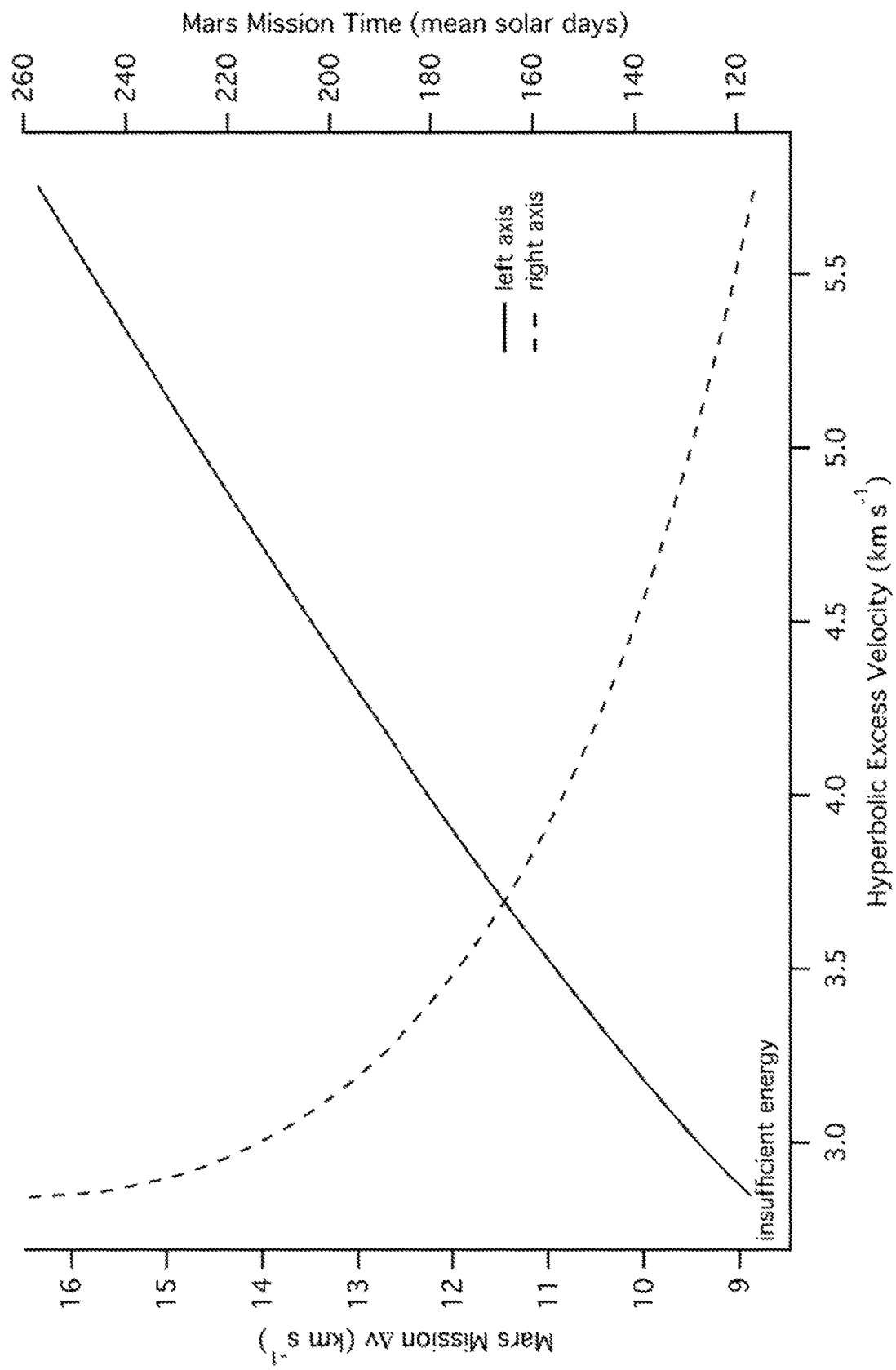
FIG. 8 shows required vehicle Δv and overall mission time as a function of hyperbolic excess velocity for a mission to 350 km Low Mars Orbit.

FIG. 8 shows required vehicle Δv (solid curve) and overall mission time (dashed curve) as a function of hyperbolic excess velocity for a mission to direct 350 km LMO. The total mission time is the sum of the ballistic, Earth departure, interplanetary transfer and Mars arrival flight times, which are determined from the appropriate form of the Kepler equation for each phase of flight. The departure phase angles for the range of hyperbolic excess velocity shown here are about 40 deg. With a muzzle velocity of 6 km s$^{-1}$, it takes a minimum of about 9 km s$^{-1}$ from the vehicle to reach LMO, broken down into about 6 km s$^{-1}$ for injection, 1 km s$^{-1}$ for plane change, and 2 km s$^{-1}$ for insertion. As excess hyperbolic velocity increases, the time-of-flight initially drops rapidly, but reaches a point of diminishing returns. At the same time, the total Δv requirement rises steadily since injection Δv increases with hyperbolic, excess speed, plane change Δv increases with transfer velocity, and insertion (braking) Δv increases with arrival velocity.

With 6 km s$^{-1}$ muzzle velocity, the launcher provides about two-thirds of the total velocity requirement for LEO, almost half of, the minimum for LLO, and around 40% of the minimum for LMO. This Δv savings is extremely significant. Because of the inverse exponential dependence of mass fraction on Δv, it translates (very approximately) to a mass fraction enhancement of a factor of five to ten depending upon assumed propulsion system efficiency, a factor of about five for liquid oxygen/liquid hydrogen ($I_{sp} \approx 390$ s), or a factor of ten for ammonium perchlorate/aluminum ($I_{sp} \approx 270$ s).

The launch destination may be a LaGrange point of two celestial bodies, where one of these celestial bodies is in a circular orbit about the other celestial body. LaGrange Points are metastable or stable points in space resulting from three-body effects that have been proposed as depot locations to support beyond. LEO space exploration. There are five LaGrange points L1 ... L5 that are either stable or metastable. For example, L1 is a metastable point between Earth and Sun, located 1.5 million km from Earth, where the gravitational influence of Earth counteracts that of the Sun to the extent that an object located at L1 can maintain its position relative to both bodies. L4 and L5 are stable points about which an object can orbit, and in the Earth-Sun system are located in the plane of motion of the Earth about the Sun at the Earth-Sun separation distance from both (equilateral triangle), one leading and the other following the motion of the Earth about the Sun, L4 and L5 points, being stable, are known to trap objects, while the other LaGrange Points are metastable and require stationkeeping. Similar LaGrange points also exist for the Earth and the Moon, for instance, LaGrange points can be accessed through impulsive launch as well, in the same manner as the methods described above to reach celestial bodies from Earth.

Variations

Many variations on the foregoing are possible and will be obvious to those of ordinary skill.

A satellite may, of course, be any sort of natural or man-made space object. A natural satellite may be a body that has either orbited another body for a substantial period of time (such as the Moon orbiting Earth), or a natural satellite may be a body that has been captured and moved to orbit (e.g. a comet or asteroid that has been moved into Earth orbit). A man-made satellite may of course be any of a large number of man-made objects (e.g. a vehicle such as a crewed capsule; a communications satellite; an observational satellite; a supply vehicle carrying supplies such as fuel, equipment, construction supplies, parts, or food and beverages; or a space station).

The methods disclosed herein may be used to place a vehicle on a path or trajectory that includes any sort of orbit. Any of the orbits for the vehicle, satellite, and place of rendezvous may be circular or may be elliptical, for instance. Such orbits include, without limitation, low earth orbit, geosynchronous orbit, geostationary orbit, and sun-synchronous orbit. The path: or trajectory, especially the launch trajectory, may or may not place the vehicle on an orbital path that intersects with the surface of the body about which the vehicle is to orbit. A second force will of course be applied to the vehicle to change its orbital path to prevent the vehicle from intersecting with the body's surface in the methods described herein.

The forces applied to a vehicle according to any of the methods discussed herein are typically not exclusively the forces that are applied to the vehicle. Other forces such as correctional forces to establish or maintain a desired orbit, stable orbit, desired or stable orientation, or desired trajectory may be applied.

Consequently, what is disclosed herein includes, without limitation on the scope of the invention described above, the following:

1. A method of launching a vehicle to orbit about Earth, wherein the method comprises launching the vehicle in a direction that is easterly using an impulsive force and along a trajectory that defines an elliptical orbital path,
   a. wherein the elliptical orbital path has an apogee and a perigee and
   b. wherein the direction of launch is in a plane corresponding to the elliptical orbital path of the vehicle.
2. A method according to paragraph 1 wherein the direction is due east.
3. A method according to paragraph 1 or paragraph 2 wherein the vehicle's trajectory and an orbit of a space object are in the same plane.
4. A method according to any one of paragraphs 1-3 wherein
   a. the vehicle's trajectory apogee is closely matched to (1) an orbital altitude of a space object or (2) a place of rendezvous with the space object,
   b. wherein the vehicle has a fly-out time from a launch site, said fly-out time being measured from a launch time to a time that the vehicle first achieves the vehicle's trajectory apogee, and
   c. wherein the vehicle launch occurs about one-third of said fly-out time prior to the space object passing overhead of a position of the launch site at the launch time.
5. A method according to any one of paragraphs 1-3 wherein the method further comprises applying a first force to the vehicle at the vehicle's trajectory apogee, said force being less than a force needed to establish a circular orbit for the vehicle so that the vehicle enters a second and descending elliptical trajectory which has a perigee at an altitude above the Earth that is lower than an altitude of the vehicle trajectory apogee.
6. A method according to paragraph 5 wherein the method further comprises applying a second force to the vehicle at the second elliptical trajectory perigee to establish a circular orbit having an altitude lower than the altitude of the vehicle's trajectory apogee.

7. A method according to any one of paragraphs 1-3 wherein the method further comprises applying a first force to the vehicle at the vehicle's trajectory apogee so that the vehicle enters a second and ascending elliptical trajectory having an apogee at an altitude above the Earth that is higher than an altitude of the vehicle's trajectory apogee.

8. A method according to paragraph 7 wherein the method further comprises applying a second force to the vehicle at the second elliptical trajectory apogee to establish a circular orbit at an altitude above the Earth that is greater than the altitude of the vehicle's trajectory apogee.

9. A method according to any one of paragraphs 1-3 wherein the method further comprises applying a first force to the vehicle at the vehicle's trajectory apogee to establish a circular orbit for the vehicle.

10. A method of closing a timing difference between a vehicle launched using an impulsive force and a satellite of rendezvous or a desired vehicle location, comprising applying a series of forces to the vehicle to provide a change in vehicle velocity $\Delta v$ that is divided into a first $\Delta v$ increment and a second $\Delta v$ increment, wherein
  a. a first force of the series provides the first $\Delta v$ increment and temporarily places the vehicle into a first orbit having a first orbital period that is significantly different from an orbital period of the satellite or the desired vehicle location so as to reduce a time difference between the vehicle and the satellite or the desired vehicle location in an integer number of orbits, and
  b. a second force of the series provides the second $\Delta v$ increment and is sufficient to establish the vehicle in a circular orbit with the satellite or the desired vehicle location.

11. A method according to paragraph 10 wherein
  a. the vehicle follows a path of an elliptical trajectory having a ballistic apogee and a ballistic perigee;
  b. the first force is applied to the vehicle at the ballistic apogee to establish a second elliptical orbit having a second apogee and a second perigee, the second elliptical orbit being a descending elliptical orbit, wherein the second apogee has an elevation equal to an elevation of the ballistic apogee, and
  c. the second force is applied when the vehicle is at the second apogee.

12. A method according to paragraph 10 wherein
  a. the vehicle follows a path of an elliptical trajectory having a ballistic apogee and a ballistic perigee;
  b. the first force is applied to the vehicle at the ballistic apogee to establish a second elliptical orbit having a second apogee and a second perigee, the second elliptical orbit being an ascending elliptical orbit, wherein the second perigee has an elevation equal to an elevation of the ballistic apogee, and
  c. the second force is applied when the vehicle is at the second perigee, 13. A method according to paragraph 11 or paragraph 12 wherein the second force additionally matches the vehicle velocity to a velocity of the satellite or the desired vehicle location.

14. A method according, to any one of paragraphs 11-13 wherein the first $\Delta v$ increment is selected to satisfy the equation $\Delta T = N(T_{cs} - T)$ where $\Delta T$ represents a timing difference between the satellite or the desired vehicle location and the vehicle, $T_{cs}$ is a period of the satellite's orbit, T is a period of the elliptical orbit of the vehicle, and N is an integer number of orbits required to correct a distance between the vehicle and the satellite or the desired vehicle location.

15. A method according to paragraph 14 wherein the first $\Delta v$ increment has a value $$\Delta v_1 = -v_{ba} + v_{cs}\left[2 - (NT_{cs}/(NT_{cs} - \Delta T))^{\frac{2}{3}}\right]^{\frac{1}{2}}$$

where $v_{ba}$ is vehicle speed at ballistic apogee and $v_{cs}$ is a speed of the satellite in circular orbit.

16. A method according to paragraph 15 wherein the second $\Delta v$ increment has a value $$\Delta v_2 = v_{cs} - v_{ba} - \Delta v_1.$$

17. A method for a vehicle launch from a first celestial body and to an orbit about a second celestial body, said method comprising
  a. launching the vehicle using an impulsive force to provide a first vehicle path;
  b. applying a second force to the vehicle along a hyperbolic path about the second celestial body and establishing a circular orbit about the second celestial body.

18. A method according to any paragraph of paragraphs 10-17 wherein the method additionally comprises launching the vehicle in an easterly direction.

19. A method according to paragraph 18 wherein the direction is due east.

20. A method according to any of paragraphs 17-19 wherein the first celestial body and the second celestial body are each individually in orbit about a third celestial body.

21. A method according to paragraph 20, wherein the third celestial body is the Sun.

22. A method according to any of paragraphs 17-19, wherein the second celestial body is the Sun, the vehicle occupies a LaGrange point of the first celestial body and the second celestial body, and the LaGrange point is in said circular orbit about the second celestial body.

23. A method for a vehicle launch from a first celestial body and to a second celestial body, said method comprising
  a. launching the vehicle at a latitude of about 23.4 deg north or about 23.4 deg south in a direction due east using a first force to establish a first vehicle path that is hyperbolic about the first celestial body, said first force comprising an impulsive force;
  b. applying a second force to the vehicle to establish a second vehicle path that intersects a path of the second celestial body; and
  c. applying a third force to the vehicle to establish the vehicle in an orbit about the second celestial body.

24. A method according to paragraph 23 wherein the second force places the second vehicle path in a plane of the second celestial body's orbit.

25. A method according to any paragraph above wherein the impulsive force is provided by a light gas gun.

26. A method according to any of paragraphs 1-24 wherein the impulsive force is provided by an electromagnetic launcher, 27. A method according to any paragraph above wherein the impulsive force is provided by a land-based or a sea-based impulsive launcher.
28. A method of launching a vehicle to orbit about Earth, wherein the method comprises launching the vehicle in a direction that is easterly using an impulsive force and into a path of a ballistic elliptical trajectory,
    a. wherein the path of the ballistic elliptical trajectory has a ballistic trajectory apogee and a ballistic trajectory perigee and
    b. wherein said direction of launch is in a plane corresponding to the ballistic elliptical trajectory of the vehicle.
29. A method according to paragraph 28 wherein the direction is due east,
30. A method according to paragraph 28 or paragraph 29 wherein the ballistic trajectory of the vehicle and an orbit of a space object are in the same plane.
31. A method according to any one of paragraphs 28-30 wherein
    a. the ballistic trajectory apogee is closely matched to (1) an orbital altitude of a space object or (2) a place of rendezvous with the space object,
    b. wherein the vehicle has a fly-out time from a launch site, said fly-out time being measured from a launch time to a time that the vehicle first achieves the ballistic trajectory apogee, and
    c. wherein the vehicle launch occurs about one-third of said fly-out time prior to the space object passing overhead of a position of the launch site at the launch time.
32. A method according to any one of paragraphs 28-30 wherein the method further comprises applying a first force to the vehicle at the ballistic trajectory apogee, said force being less than a force needed to establish a circular orbit for the vehicle so that the vehicle enters a second and descending elliptical trajectory which has a perigee at an altitude above the Earth that is lower than an altitude of the ballistic trajectory apogee.
33. A method according to paragraph 32 wherein the method further comprises applying a second force to the vehicle at the second elliptical trajectory perigee to establish a circular orbit having an altitude lower than the altitude of the ballistic trajectory apogee.
34. A method according to any one of paragraphs 28-30 wherein the method further comprises applying a first force to the vehicle at the ballistic trajectory apogee so that the vehicle enters a second and ascending elliptical trajectory having an apogee at an altitude above the Earth that is higher than an altitude of the ballistic trajectory apogee.
35. A method according to paragraph 34 wherein the method further comprises applying a second force to the vehicle at the second elliptical trajectory apogee to establish a circular orbit at an altitude above the Earth that is greater than the altitude of the ballistic trajectory apogee.
36. A method according to any one of paragraphs 28-30 wherein the method further comprises applying a first force to the vehicle at the ballistic trajectory apogee to establish a circular orbit for the vehicle.
37. A method for a vehicle launch from a first celestial body to an orbit about a LaGrange point, said method comprising
    a. launching the vehicle using an impulsive force to provide a first vehicle path;
    b. applying a second force to the vehicle along a hyperbolic path about the LaGrange point and establishing an orbit about the LaGrange point.
38. A method according to paragraph 37 wherein the first celestial body and the LaGrange point are each individually in orbit about a second celestial body.
39. A method, according to paragraph 38 wherein the first celestial body is a planet and the second celestial body is the Sun.
40. A method according to paragraph 37 wherein the LaGrange Point and a second celestial body are each individually in orbit about the first celestial body.
41. A method according to paragraph 40 wherein the first celestial body is a planet and the second celestial body is a moon of the first celestial body.

What is claimed is:
1. A method of closing a timing difference between a vehicle launched using an impulsive force and a satellite of rendezvous or a desired vehicle location, comprising applying a series of forces to the vehicle to provide a change in vehicle velocity $\Delta v$ that is divided into a first $\Delta v$ increment and a second $\Delta v$ increment, wherein
    a. a first force of the series provides the first $\Delta v$ increment and temporarily places the vehicle into a first orbit having a first orbital period that differs from an orbital period of the satellite or the desired vehicle location so as to reduce a time difference between the vehicle and the satellite or the desired vehicle location in an integer number of orbits, and
    b. a second force of the series provides the second $\Delta v$ increment and is sufficient to establish the vehicle in a circular orbit with the satellite or the desired vehicle location, and wherein
    c. the vehicle follows a path of an elliptical trajectory having a ballistic apogee and a ballistic perigee;
    d. the first force is applied to the vehicle at the ballistic apogee to establish a second elliptical orbit having a second apogee and a second perigee, the second elliptical orbit being a descending elliptical orbit, wherein the second apogee has an elevation equal to an elevation of the ballistic apogee, and
    e. the second force is applied when the vehicle is at the second apogee.
2. The method of claim 1, wherein the second force additionally matches the vehicle velocity to a velocity of the satellite or the desired vehicle location.
3. The method of claim 1, wherein the first $\Delta v$ increment is selected to satisfy the equation $\Delta T = N(T_{cs} - T)$ where $\Delta T$ is a positive value that represents a timing difference between the satellite or the desired vehicle location and the vehicle, $T_{cs}$ is a period of the satellite's orbit, T is a period of the elliptical orbit of the vehicle, and N is an integer number of orbits required to correct a distance between the vehicle and the satellite or the desired vehicle location.
4. The method of claim 3, wherein the first $\Delta v$ increment has a value

$$\Delta v_1 = -v_{ba} + v_{cs}\left[2 - (NT_{cs}/(NT_{cs} - \Delta T))^{\frac{2}{3}}\right]^{\frac{1}{2}}$$

where $v_{ba}$ is a vehicle speed at ballistic apogee and $v_{cs}$ is a speed of the satellite in circular orbit.
5. The method of claim 4, wherein the second $\Delta v$ increment has a value $\Delta v_2 = v_{cs} - v_{ba} - \Delta v_1$.

6. The method of claim 1, wherein the method additionally comprises launching the vehicle due east or in an easterly direction.

7. The method of claim 1, wherein the impulsive force is, provided by a light gas gun, an electromagnetic launcher, or a land-based or sea-based impulsive launcher.

8. The method of claim 1, wherein the first orbit and the second orbit are coplanar.

9. The method of claim 1, wherein the first force results from a first short motor burn and the second force results from a second short motor burn.

10. The method of claim 1, wherein the vehicle has a launch trajectory, and the first force is applied to the vehicle during the launch trajectory to establish the first orbit.

11. A method of closing a timing difference between a vehicle launched using an impulsive force and a satellite of rendezvous or a desired vehicle location, comprising applying a series of forces to the vehicle to provide a change in vehicle velocity $\Delta v$ that is divided into a first $\Delta v$ increment and a second $\Delta v$ increment, wherein
   a. a first force of the series provides the first $\Delta v$ increment and temporarily places the vehicle into a first orbit having a first orbital period that differs from an orbital period of the satellite or the desire vehicle location so as to reduce a time difference between the vehicle and the satellite or the desired vehicle location in an integer number of orbits, and
   b. a second force of the series provides the second $\Delta v$ increment and is sufficient to establish the vehicle in a circular orbit with the satellite or the desired vehicle location wherein
   c. the vehicle follows a path of an elliptical trajectory having a ballistic apogee and a ballistic perigee;
   d. the first force is applied to the vehicle at the ballistic apogee to establish a second elliptical orbit having a second apogee and a second perigee, the second elliptical orbit being an ascending elliptical orbit, wherein the second perigee has an elevation equal to an elevation of the ballistic apogee, and
   e. the second force is applied when the vehicle is at the second perigee.

12. The method of claim 11, wherein the second force additionally matches the vehicle velocity to a velocity of the satellite or the desired vehicle location.

13. The method of claim 11, wherein the first $\Delta v$ increment is selected to satisfy the equation $\Delta T = N(T_{cs} - T)$ where $\Delta T$ is a negative value that represents a timing difference between the satellite or the desired vehicle location and the vehicle, $T_{cs}$ is a period of the satellite's orbit, $T$ is a period of the elliptical orbit of the vehicle, and N is an integer number of orbits required to correct a distance between the vehicle and the satellite or the desired vehicle location.

14. The method of claim 13, wherein the first $\Delta v$ increment has a value $$\Delta v_1 = -v_{ba} + v_{cs}\left[2 - (NT_{cs}/(NT_{cs} - \Delta T))^{\frac{2}{3}}\right]^{\frac{1}{2}}$$

where $v_{ba}$ is vehicle speed at ballistic apogee and $v_{cs}$ is a speed of the satellite in circular orbit.

15. The method of claim 14, wherein the second $\Delta v$ increment has a value $\Delta v_2 = -(v_{cs} - v_{ba} - \Delta v_1)$.

16. The method of claim 11, wherein the vehicle has a launch trajectory, and the first force is applied to the vehicle during the launch trajectory to establish the first orbit.

17. The method of claim 16, wherein the launch trajectory re-intersects the Earth.

18. The method of claim 11, wherein the first force results from a first short motor burn and the second force results from a second short motor burn.

19. A method of closing a timing difference between a vehicle launched using an impulsive force and a satellite of rendezvous or a desired vehicle location, comprising applying a series of forces to the vehicle to provide a change in vehicle velocity $\Delta v$ that is divided into a first $\Delta v$ increment and a second $\Delta v$ increment, wherein
   a. a first force of the series is applied to the vehicle during a launch trajectory which reintersects Earth and which provides the first $\Delta v$ increment that temporarily places the vehicle into a first orbit having a first orbital period which differs from an orbital period of the satellite or the desired vehicle location so as to reduce a time difference between the vehicle and the satellite or the desired vehicle location in an integer number of orbits, and
   b. a second force of the series provides the second $\Delta v$ increment and is sufficient to establish the vehicle in a circular orbit with the satellite or the desired vehicle location, and wherein
   c. the launch trajectory is an elliptical trajectory having a ballistic apogee and a ballistic perigee;
   d. the first force is applied to the vehicle at the ballistic apogee to establish a second elliptical orbit having a second apogee and a second perigee, the second elliptical orbit being a descending elliptical orbit, wherein the second apogee has an elevation equal to an elevation of the ballistic apogee, and
   e. the second force is applied when the vehicle is at the second apogee.

20. The method of claim 19, wherein the second force additionally matches the vehicle velocity to a velocity of the satellite or the desired vehicle location.

21. The method of claim 19, wherein the first force results from a first short motor burn and the second force results from a second short motor burn.

* * * * *